June 23, 1953 M. H. NIELSEN 2,642,592

METHOD AND MACHINE FOR ASSEMBLING WASHERS WITH FASTENERS

Filed Dec. 11, 1948 12 Sheets-Sheet 1

INVENTOR.

Moritz H. Nielsen

BY

Moore, Olson & Trexler

Attys

June 23, 1953 M. H. NIELSEN 2,642,592

METHOD AND MACHINE FOR ASSEMBLING WASHERS WITH FASTENERS

Filed Dec. 11, 1948 12 Sheets-Sheet 2

INVENTOR.

Moritz H. Nielsen

BY

Moore, Olson & Trexler attys.

INVENTOR.
Moritz H. Nielsen
BY Moore, Olson & Trexler
attys.

METHOD AND MACHINE FOR ASSEMBLING WASHERS WITH FASTENERS

Filed Dec. 11, 1948 12 Sheets-Sheet 4

Inventor
Moritz H. Nielsen
By: Moore Olson & Trexler attys.

June 23, 1953 M. H. NIELSEN 2,642,592

METHOD AND MACHINE FOR ASSEMBLING WASHERS WITH FASTENERS

Filed Dec. 11, 1948 12 Sheets-Sheet 5

INVENTOR.
Moritz H. Nielsen
BY
Moore, Olson & Trexler
Attys.

METHOD AND MACHINE FOR ASSEMBLING WASHERS WITH FASTENERS

Filed Dec. 11, 1948 12 Sheets-Sheet 6

INVENTOR.
Moritz H. Nielsen
BY
Moore, Olson & Trexler
Attys.

METHOD AND MACHINE FOR ASSEMBLING WASHERS WITH FASTENERS

Filed Dec. 11, 1948 12 Sheets-Sheet 7

INVENTOR.
Moritz H. Nielson
BY
Moore, Olson & Trexler
Attys.

METHOD AND MACHINE FOR ASSEMBLING WASHERS WITH FASTENERS

Filed Dec. 11, 1948

INVENTOR.
Moritz H. Nielsen
BY
Moore, Olson & Trexler
attys.

METHOD AND MACHINE FOR ASSEMBLING WASHERS WITH FASTENERS

Filed Dec. 11, 1948 12 Sheets-Sheet 9

INVENTOR.
Moritz H. Nielsen
BY
Moore, Olson & Trexler
Attys.

METHOD AND MACHINE FOR ASSEMBLING WASHERS WITH FASTENERS

Filed Dec. 11, 1948 12 Sheets-Sheet 10

INVENTOR.

BY Moritz H. Nielsen

By: Moore, Olson & Trexler attys.

June 23, 1953 M. H. NIELSEN 2,642,592

METHOD AND MACHINE FOR ASSEMBLING WASHERS WITH FASTENERS

Filed Dec. 11, 1948 12 Sheets-Sheet 11

INVENTOR.
Moritz H. Nielsen
BY
Moore, Olson & Trexler
Attys.

METHOD AND MACHINE FOR ASSEMBLING WASHERS WITH FASTENERS

INVENTOR.
Moritz H. Nielsen
BY
Moore, Olson & Trexler
Attys

Patented June 23, 1953

2,642,592

UNITED STATES PATENT OFFICE 2,642,592

METHOD AND MACHINE FOR ASSEMBLING WASHERS WITH FASTENERS

Moritz H. Nielsen, Chicago, Ill., assignor to Illinois Tool Works, Chicago, Ill., a corporation of Illinois Application December 11, 1948, Serial No. 64,844

31 Claims. (Cl. 10—2)

This invention relates to a method and machine for producing, as an article of manufacture, a unit assembly of a threaded fastener and a washer, particularly a screw and lock washer.

It is an object of this invention to provide a machine for making unit assemblies of a threaded fastener and a washer, specifically small screw and washer units or the like, at a much higher rate of production than heretofore possible.

Prior machines for assembling screws and washers have been limited in capacity by reason of the use of intermittently operated mechanisms for feeding either the screw elements or the washer elements to the assembly station or by the use of intermittently operated assembly mechanisms. Such assembly machines are frequently associated with or part of a thread rolling machine the capacity of which is, or may readily be made, greater than the capacity of the assembly machine or mechanism.

It is accordingly an object of this invention to provide a method, machine or mechanism for assembling screws and washers or like fasteners at a continuous, uniform rate of speed such as to make full utilization of the capacity of the thread rolling mechanism or machine.

One of the chief difficulties encountered in attempts to increase the production rate of screw and washer assembly machines and mechanisms has been the difficulty of feeding washers, particularly lock washers, individually in properly oriented position, at the necessary high speed. The manufacture of washers in strip form has made it possible to assure a greater uniformity in the feed of the washers. Such mechanisms, as disclosed in Poupitch Patent 2,390,121, and in Nielsen Patent 2,284,676, although accomplishing a considerable increase in the uniformity of feed of the washers over anything known previously, are restricted as to the maximum rate at which they can feed washers by reason of the intermittent nature of the mechanism feeding the strip of washers to the assembly station.

It is therefore an object of this invention to provide an assembly machine in which the washers in strip form may be fed continuously at a uniform rate and while moving at said rate telescoped with screw elements or blanks, thereby greatly increasing the rate of assembly of the screws and washers.

Another object of the present invention is to provide in a screw and washer machine of the type in which the washers are fed in strip form to the assembly mechanism or station, means operable upon the strip of washers after the screw elements have been assembled with the strip continuously to sever the washers from the strip without interference with the continuous feeding of the washer strip or the continuous operation of the assembly mechanism.

The present invention contemplates the utilization of a strip of washers, each washer being joined to longitudinally extending continuous marginal portions or bands by transverse pieces or lugs, and the provision of mechanism including novel and more efficient means continuously feeding such a strip of connected readily severable washers along a path intersecting the path of screw elements or blanks fed continuously by novel assembly means so as to mesh the shanks of the screw elements or blanks successively into the apertures of the washers of the strip, the strip feeding means then continuing to feed the screw elements assembled therewith to novel severing or shearing means by which the pieces connecting washers to the strip are severed therefrom and the waste material from the strip and the assembled, now individual, units directed along different paths, the assembled units being fed by improved feed and control means to a mechanism which enlarges the shank of each screw element beneath the washer, as by rolling a thread thereon, so as to retain the washer permanently on the screw element, and the waste material being fed or directed to unique waste disposing means.

Machines for assembling screws and washers with which I am familiar are not entirely satisfactory for the purpose of assembling small screws and washers because the feeding devices frequently fail to feed such small screws or washers to the desired point or device for assembling, and the known assembly devices are unable to hold them in the proper positions and alignment for assembly. It has therefore been impossible or impractical to attempt to supply or manufacture assembled screw and washer units in the smaller sizes.

It is accordingly an object of this invention to provide a method and means for making assembled screws and washer units of the very smallest sizes.

A more specific object of my invention is to provide a screw forming machine, preferably a thread rolling machine, including a feed roller having teeth engaging the tabs of a specially designed strip of washers to feed the strip from a roll in the direction of a screw feeding chute; means for telescoping screw elements with the strip while it is being fed; means which, while the washers are over the chute, sever them from the strip; and means for feeding the assembled screws and washers after severance from the strip to a screw forming or thread rolling device which so forms the screw element, or a thread thereon, as permanently to retain the washers on the screw elements.

Other and further objects and advantages of the present invention will be apparent when taken in connection with the accompanying drawings wherein.

Figure 1:
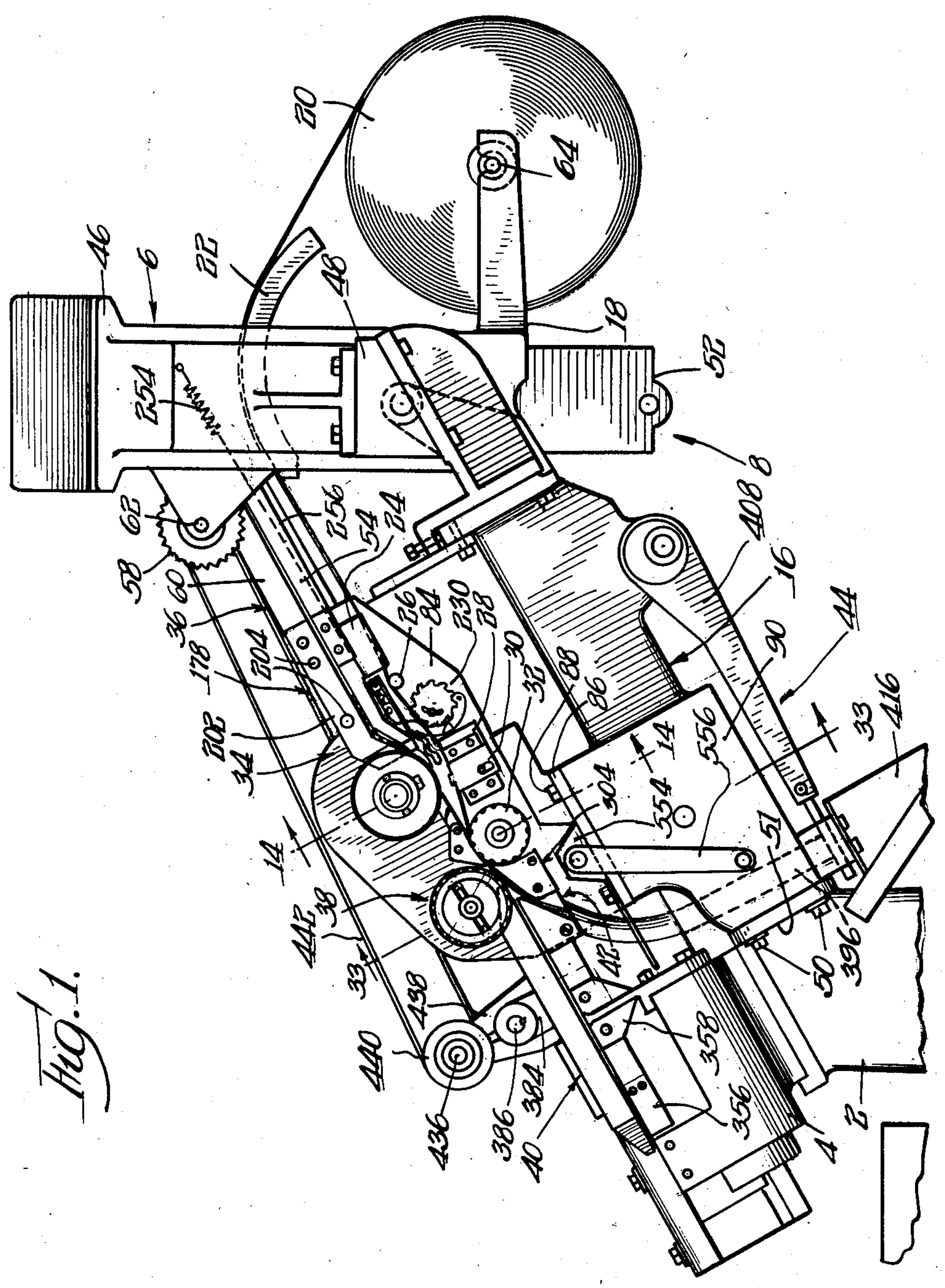
Fig. 1 is a view in vertical elevation of a machine embodying the invention.

As shown in the drawings, a machine which forms one embodiment of the present invention comprises a screw thread rolling machine of standard type, such as shown in Wilcox Patents No. 1,584,263 of May 11, 1926, and No. 1,798,919 of March 31, 1931, on which is provided a plurality of additional and substitute or auxiliary mechanisms by which said machine may be adapted for the production of permanently assembled screw and washer units.

Figures 2, 3:
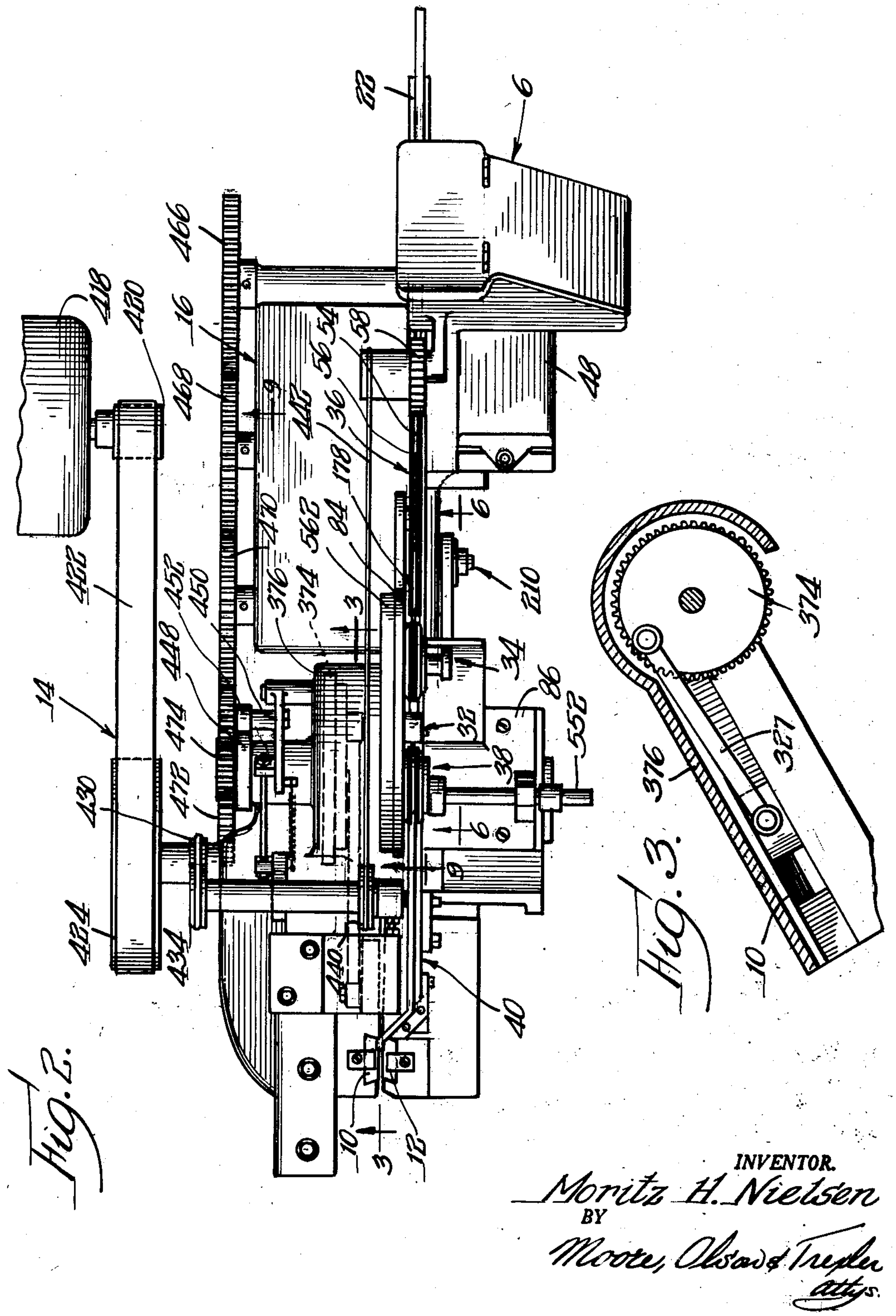
Fig. 2 is a plan view of the machine shown in Fig. 1.
Fig. 3 is a fragmentary view in vertical section taken substantially along the line 3—3 of Fig. 2.
Figures 39, 40, 41, 42, 43, 44:
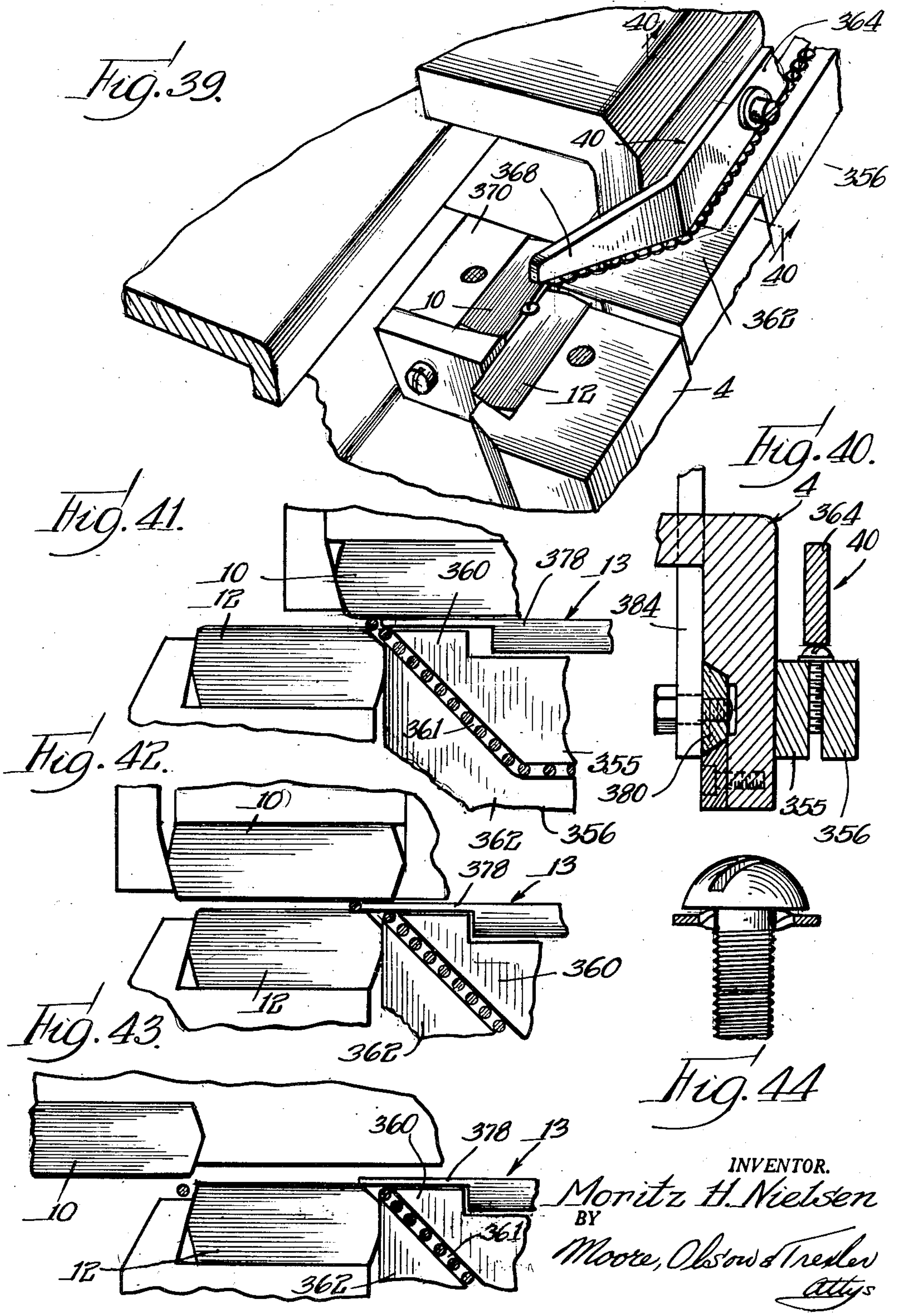
Fig. 39 is a detailed perspective view of the thread rolling mechanism and adjacent structure.
Fig. 40 is a view in vertical section taken substantially along the line 40—40 of Fig. 39.
Figs. 41 to 43 are diagrammatic plan views illustrating the operation of the thread rolling mechanism.
Fig. 44 is a vertical elevation of a screw blank and lock washer assembly produced by the machine of Figs. 1 to 43.

The standard type of thread rolling machine comprises a main base or pedestal 2, Fig. 1; an auxiliary base or body 4 secured to or formed integrally with the base 2 and inclined at an angle of approximately 30 degrees to the horizontal; a hopper 6 for receiving a mass of screw blanks; a screw blank feed mechanism 8 for discharging blanks from the hopper 6; a pair of thread rolling dies 10 and 12, Figs. 2 and 39, a starter mechanism 13, Figs. 5 and 41 to 43, and a driving mechanism 14.

Figures 4, 5:
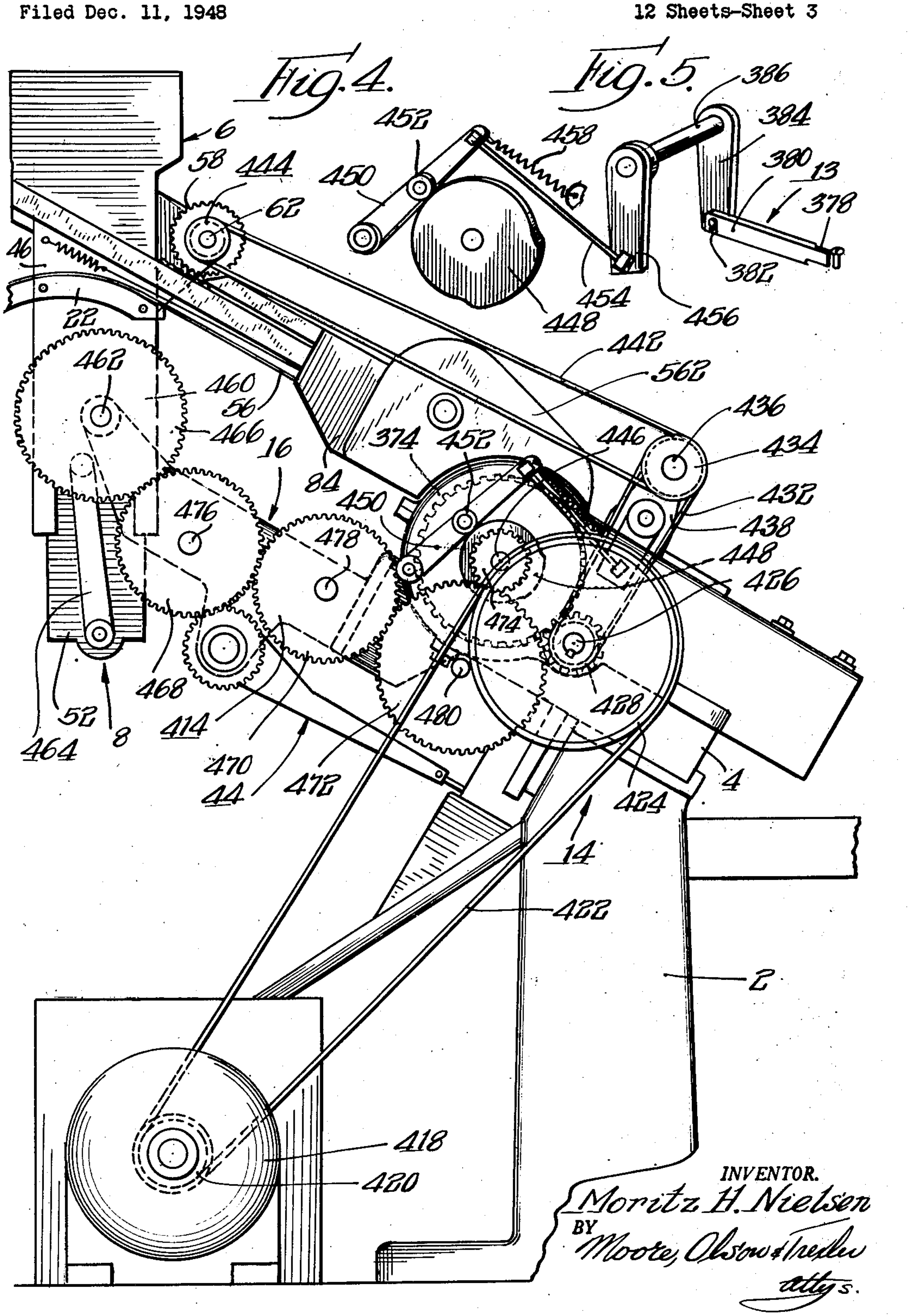
Fig. 4 is a view in vertical elevation of the opposite side of the machine from that shown in Fig. 1.
Fig. 5 is a diagrammatic view in perspective of part of the machine.
Figures 6, 7, 8:
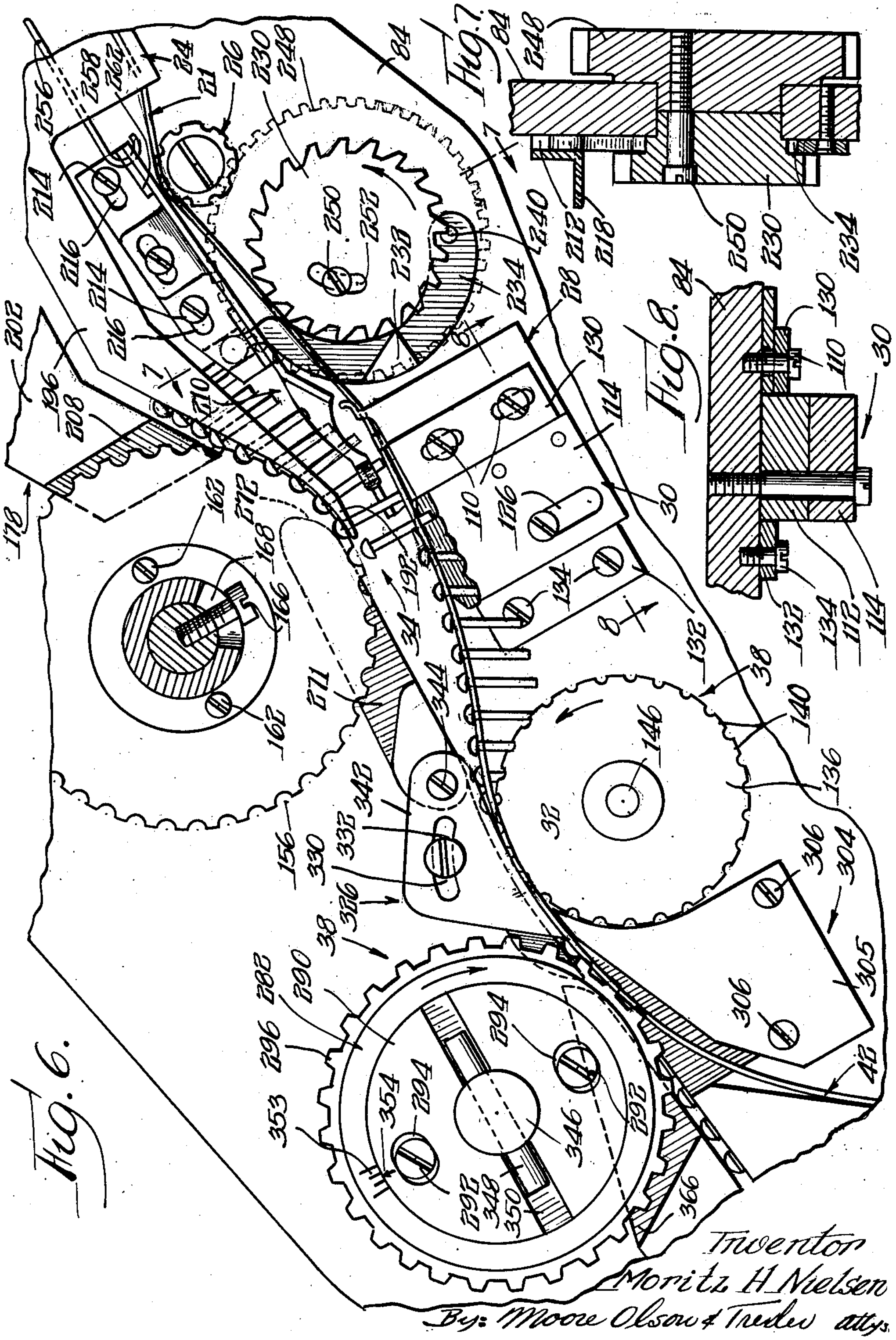
Fig. 6 is a fragmentary view in vertical elevation taken along the line 6—6 of Fig. 2.
Fig. 7 is a fragmentary view in vertical section taken along the line 7—7 of Fig. 6.
Fig. 8 is a fragmentary view in generally horizontal section taken along the line 8—8 of Fig 6.
Figure 21:
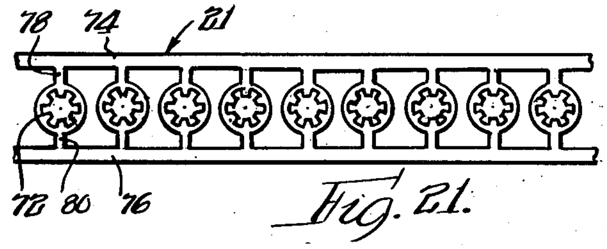
Fig. 21 is a plan view illustrating the preferred form of the washer strip to be handled by the machine.

The additional and substitute or auxiliary mechanisms comprise a supporting base, body or casting 16, Figs. 1, 2 and 4, interposed between the main and auxiliary bases 2 and 4 and the hopper 6; a support 18 for a roll 20 which comprises a wound strip 21 of lock washers, shown in Fig. 21; washer strip feeding and guiding means and rolls 22, 24, 26, 28, 30 and 32, Figs. 1 and 6; a screw blank and washer assembling mechanism 34; screw blank feeding means 36 for delivering the screw blanks discharged from the hopper 6 to the assembly mechanism 34; washer strip severing means or device 38; an improved feeding means or chute 40 conveying the assembled screws and washers from the severing means or device 38 to the starting mechanism 13 and the thread rolling dies 10 and 12; waste material guide or feed means 42 for the waste strips severed from the strip of washers by the severing means or device 38; waste cutting means 44 and driving connections between the driving mechanism 14, the additional and substitute or auxiliary mechanisms and the screw feed mechanism 8.

*Hopper and feed mechanism for the screw blanks*

As shown in Figs. 1, 2 and 4, the hopper 6 and feed mechanism 8 for the screw blanks comprise a hopper casting 46 adjustably mounted in the conventional manner on a casting 48 in turn adjustably mounted on the rear end of the casting 16, the casting 16 being mounted at its forward end as by bolts 50 on a side flange 51 of the main base or pedestal 2. Slidably mounted in guideways in the hopper casting 46 is a reciprocating plate 52 which as it moves upwardly, picks up a mass of screw blanks in the hopper 6 and drops them onto guide chute 36 which comprises spaced bars 54 and 56 which extend into and are supported on the hopper casting and project forwardly therefrom so that the screw blanks move by gravity down these chute bars, the shanks being guided by these bars and the heads resting thereon.

Mounted on the hopper casting in proximity to the chute bars 54 and 56 is the usual rotatable clearance wheel 58 which prevents screw blanks not properly seated in and on the chute bars from passing out of the hopper. A cover bar 60 extends from the clearance wheel centrally over the chute bars to confine the screw blanks in the chute, the cover bar being adjustably mounted in the usual manner, not shown, on one of the chute bars for vertical adjustment to accommodate screw blanks having different size heads.

The screw blank feed plate 52 is continuously reciprocated and the shaft 62, on which the clearance wheel 58 is mounted, is continuously rotated, by the drive connections hereinafter described from the driving mechanism 14.

*The washer strip feeding and guiding means*

As previously described, the washer strip to be assembled with the screw blanks is supplied to the machine in the form of a roll 20 mounted on a rod 64 supported for free rotation on the support 18 which may comprise a bracket secured to or formed integrally with the body casting 16 or secured to the hopper mounting casting 46 and provided with spaced arms for receiving between them the washer roll 20 and having notches in the arms to receive the rod 64 for free rotation therein. The roll 20 may, if desired be mounted on a separate reel support standing on the floor back of the machine.

From the roll 20, the washer strip passes over the guide 22 (Figs. 1, 2 and 4) which is in the form of an arcuate plate bolted to the back of the hopper casting 46. The strip then passes longitudinally of the machine beneath the screw blank feed chute 36 and through guide blocks 66 and 68, Fig. 36, having strip-receiving guide slots 70 adjacent their lower ends and in their inner faces. The washer strip 21, best seen in Fig. 21, comprises a series of lock washers 72 spaced longitudinally of the strip and joined to the side margins 74 and 76 by readily severable connecting pieces or tabs 78 and 80, which form carrier tabs or feed links. As shown in Fig. 21, the washers are in the form of internal tooth lock washers, although it will be readily apparent that the washers may be of the external tooth type, the connecting pieces or tabs 78 and 80 forming extensions of limited cross sections of the diametrically opposite external teeth.

Figures 22, 23, 24, 25, 26, 27, 28, 29, 30, 31, 32:
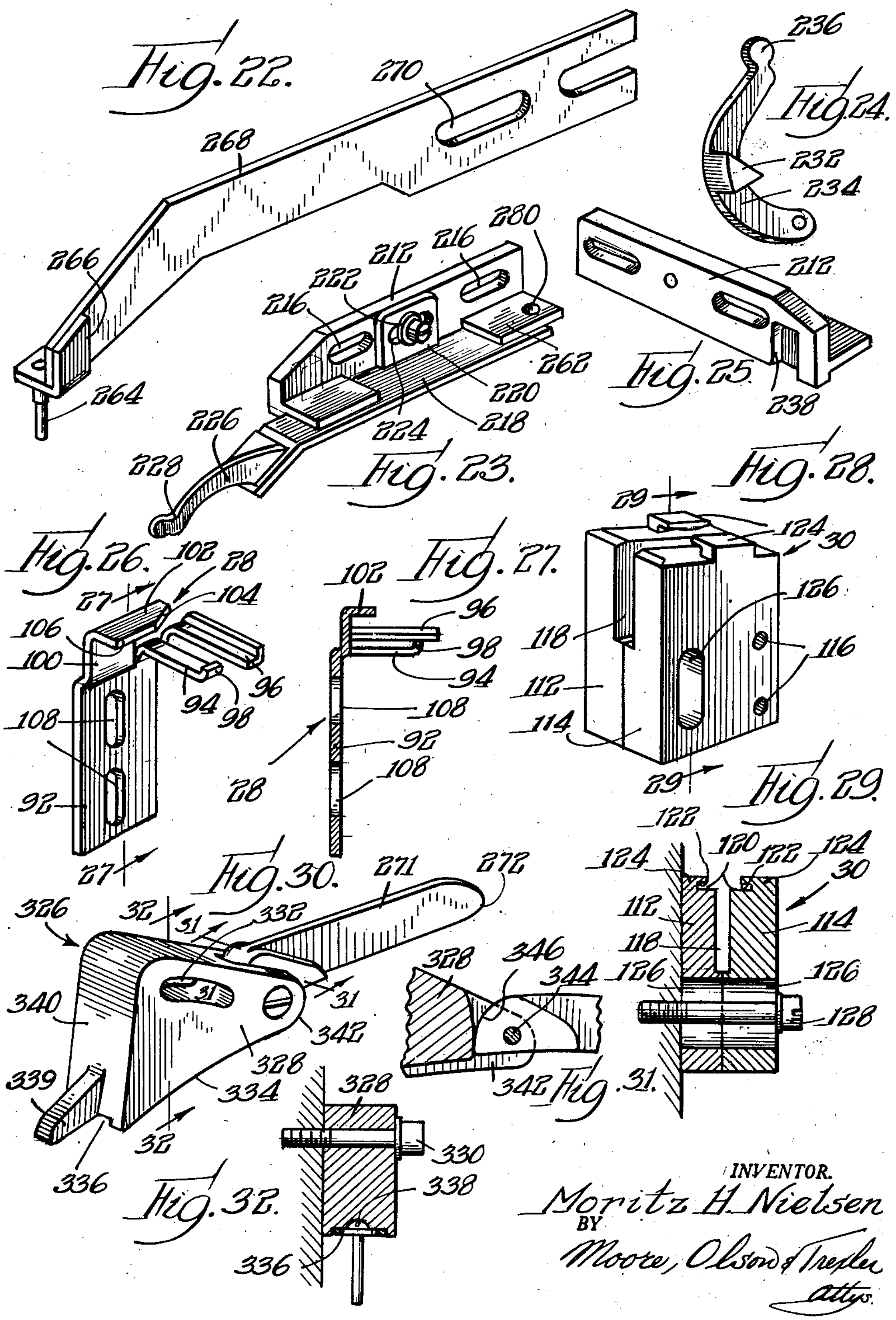
Figs. 22 to 26 are views in perspective of individual parts of the machine better illustrating their construction.
Fig. 27 is a view in vertical section taken along the line 27—27 of Fig. 26.
Fig. 28 is a perspective view of a washer strip guide element.
Fig. 29 is a view in vertical section taken along the line 29—29 of Fig. 28.
Fig. 30 is a view in perspective of a hold-down guide for the washer strip and screws assembled therewith.
Fig. 31 is a fragmentary view in vertical section taken along the line 31—31 of Fig. 30.
Fig. 32 is a fragmentary view showing the mounting of the hold-down and guide of Fig. 30, the hold-down being shown in section substantially along the line 32—32 of Fig. 30.

From the guide blocks 66 and 68 the washer strip passes over the guide 26, which comprises a toothed roller journaled on a stud 82 mounted in the rearwardly extending portion of a plate 84, Fig. 1, formed integrally with a generally horizontal plate portion 86, secured, as by bolts 88, to the forward portion 90 of the auxiliary supporting base or casting 16. From the idler roller 26 the strip passes to the guides 28 and 30, Fig. 6, the guide 28 comprising, as best seen in Figs. 26 and 27, a plate 92 formed with vertically and horizontally displaced guide bars 94 and 96. The washer strip passes beneath the guide bar 96, as shown in Fig. 6, so that it is held against upward movement, and it passes over the guide bar 94 so that it is held against downward movement. The guide bar 94 is formed at its outer end with an upturned lug 98 which cooperates with a reduced upwardly extending portion 100 of the plate 92 to prevent lateral shifting of the washer strip. The plate 92 is also formed at the upper end of the reduced portion 100 with an outwardly turned lug or cam portion 102 having screw aligning and camming surfaces or edges 104 and 106. The plate 92 is also formed with elongated mounting slots 108 permitting passage of mounting bolts 110, Figs. 6 and 8, threaded into the plate 84. The elongated slots 108 on loosening of the bolts 110 permit vertical adjustment of the guide 28 in accordance with the length of the shanks of the screw elements which are to be assembled with the strips, as will presently appear.

The guide means 30 (Figs. 1, 6, 8, 18, 28 and 29) comprises a pair of blocks 112 and 114 (Figs. 28 and 29) aligned with respect to each other as by pins 116 and formed to provide a slot 118 between the confronting faces of the blocks at the upper portions thereof to receive the shanks of the screw elements after they are assembled with the washer and as the strip with the assembled washer passes over the surface of the guide blocks. The upper ends of the blocks are slotted and milled to form washer strip supporting and guiding surfaces 120 and strip hold-down and guide surfaces 122. The hold-down surfaces 122 are beveled or tapered at the ends of the overhanging guide pieces 124, as best shown in Fig. 6, so as to permit the strip to enter between the surfaces 120 and 122 at an angle and to pass therefrom at an angle, depending upon the vertical adjustment of the blocks 112 and 114. These blocks are formed with elongated aligned slots 126, Figs. 6, 28 and 29, to receive a mounting bolt 128 threaded into the plate 84. The blocks 112 and 114 are precisely aligned in a generally vertical plane and held against tilting by a pair of side bars 130 and 132, Figs. 6 and 8, the bar 130 being mounted by the mounting bolts 110 for the guide plate 92 and the bar 132 being mounted as by the bolts 134 threaded into the plate 84.

The washer strip is driven or fed continuously by the feed device 32 (Figs. 1, 6, 14 and 18) which preferably comprises a roller 136 having a central circular slot 138 (Fig. 14) forming a passage for the shanks of the screw elements assembled with the strip and having peripheral teeth 140 (Figs. 6 and 14) on opposite sides of the slot 138. The teeth 140 in a direction axially of the drum are of a thickness comparable to the length of the connecting pieces or tabs 78 and 80 of the washer strip so that the teeth engage successive tabs and the driving wheel constitutes in effect a drive sprocket and the connecting pieces or tabs constitute driving links meshing therewith.

The peripheral surface of the drum on opposite sides of the teeth 140 from the slot 138 is provided with smooth surfaces 142 and 144 to form a roller guide for the side margins 74 and 76 of the washer strip. The feed roller 136 is secured as by bolt 146 to the drive gear 148 having a reduced hub portion 150 journaled in the plate 84.

*Screw blank and washer assembling mechanism*

As shown in Figs. 1, 6, 14, 15, 18, 19, 20, 22 to 25, and 36, the screw blank and washer assembly mechanism 34 comprises a pair of feed disks 152 and 154, having equally spaced generally semi-circular recesses 156 (Figs. 6 and 18) in their periphery. It will be evident that recesses 156 of other suitable shape may be provided to accommodate various types of heads. The disks 152 and 154 and a spacer disk 158 of smaller diameter and interposed between disks 152 and 154 are secured to a driving collar 160 by a pair of bolts 162. The driving collar 160 is adjustably secured to a driving stud 164 by a bolt 166 threaded into the stud and received in an arcuate slot 168 in the hub of the driving collar. The stud 164 passes through the collar 160, the disks 152, 154 and 158, and a driving gear 170, Fig. 14, keyed to the stud and having a reduced hub portion journaled in the plate 84. The driving stud is formed at one end with a head 172 and receives at its other end a washer 174 and pin 176 to secure the gear, disks and collar on the stud. The feed or assembly disks 152 and 154 cooperate with a screw blank guide chute 178, Figs. 1, 6, 18 and 36, to feed the screw blanks from the guide chute 36 in a continuous succession in synchronism with the washer strip and to assemble them with the washers of the strip. The feed chute 178 comprises a pair of spaced chute bars 180 and 182 which constitute extensions of the chute bars 54 and 56 and are secured thereto as by tie plates 184 and bolts 186. The chute bars 180 and 182 may be formed integrally with the washer strip guide blocks 66 and 68 and may be mounted on the plate 84 as by a bolt 188 and a spacing strip, not shown, between the guide blocks.

The chute bars 180 and 182 are formed at their outer ends to provide guide fingers 190 and 192 extending arcuately of the disks 152 and 154. The guide fingers 190 and 192 are formed with arcuate upper surfaces substantially concentric to the disks and are tapered to a relatively thin edge at their outer ends. The upper head engaging and guiding surfaces 194 and 196 of the chute bars 180 and 182, which surfaces are inclined at an angle of substantially 30 degrees, are joined to the arcuate head engaging surfaces of the guide fingers by sharply inclined head engaging guide surfaces 198 and 200 which are tangent to the arcuate surfaces. The feed chute 178 also includes a cover bar 202 which constitutes in effect an extension of the cover bar 60 of the chute 36 and is secured to the plate 84 as by bolts 204 and spacing washers, not shown.

The cover bar 202 extends over the guide surfaces 194, 196, 198 and 200 of the chute bars and parallel thereto in sufficiently closely spaced relation to the chute bars 180 and 182 to permit ready passage of the screw blanks down the chute but prevent the screw blanks from piling up in the chute. The cover bar 202 is formed at its forward end with a portion 208 of reduced thickness extending therefrom between the assembly or guide disks 152 and 154 so as to hold the screw blanks properly positioned in the chute bars for gravitation of single blanks into the head receiving recesses of the assembly or feed disks.

As the assembly wheel rotates at a continuous uniform rate, each recess 156 as it approaches the arcuate surfaces of the feed chute fingers 190 and 192 picks up the head of the leading screw blank at the bottom end of the sharply inclined surfaces 198 and 200 of the feed chute and the wheel thereafter feeds the screw blanks, the heads of which are received in the recesses, at said uniform rate along the arcuate surfaces of the feed fingers. As the screws are fed along the arcuate surfaces of the chute fingers they assume various positions relative to the wheel so that the shanks of the screw elements may assume various angular positions wherein the shanks are not sufficiently aligned with the washer apertures to cause the free ends of the screw blanks to project into the washer apertures. This possibility of misalignment increases as the length of the shanks of the screw blanks being assembled is increased.

Accordingly, applicant provides screw aligning or centralizing means 210, Figs. 6 and 18 to 20, for shifting the screw blanks to bring the shanks thereof into precise alignment with the washer apertures so that as the washer strip is continuously fed the free end of the shank of each screw blank will be progressively projected more and more into the washer as the assembly wheel continues to rotate synchronously with the advance of the washer strip. This aligning or centralizing means preferably comprises a reciprocating slide 212 slidably mounted as by bolts 214, Fig. 6, threaded into the plate 84 and received in slots 216 in the slide 212. A bar 218 having a central upstanding flange 220 is adjustably secured to the slide bar 212 as by a bolt 222 received in a slot 224 of the flange 220. A resilient shank engaging and locating or aligning finger 226 is secured in any convenient manner to the forward end of the bar 218 and projects forwardly therefrom. The finger 226 is substantially rigid in a direction longitudinally, or in the direction of movement of the bar 218. It is resiliently yieldable transverse to the path of movement. The finger is formed at its outer end with a shallow hook portion 228 to pick up or partially encompass the shank of the screw blank as the bar 218 is moved in a forward direction. The finger 226 cooperates with the screw shank aligning lug 102 of the washer strip guide 92, and more particularly with the inclined or camming edge 104 and the aligning edge 106 of that lug, as will presently appear.

The slide 212, and consequently the bar 218 and finger 226, are moved in a forward direction, i. e., in the direction in advance of the washer strip by a ratchet 230, Fig. 6, having teeth engaging with a tooth 232 of an arcuate lever or pawl 234, best seen in Fig. 24. The lever pawl 234 is formed at one end with a knuckle 236 received in a slot 238 in the rear face of the slide 212, Fig. 25. Since the slide 212 is mounted directly in a face to face engagement with the plate 84, the rear side of the slot 238 is closed by that plate 84 and the knuckle 236 of the operating lever 234 thus held within the slot 238. The pawl or lever 234 is pivoted at its opposite end, as by pin 240, Fig. 6, on the plate 84 and the lever extends circumferentially above, and moves behind, the ratchet 230. The ratchet 230 is adjustably secured to a driving gear 248, Figs. 6 and 7, as by a bolt 250 threaded into the driving gear and passing through an arcuate slot 252 in the ratchet 230. The driving gear 248 and the ratchet 230 are provided with reduced hub portions, as shown in Fig. 7, journaled in the plate 84 and the ratchet 230 is formed with a reduced portion between the toothed periphery and the outer face of the plate 84 to provide an annular space permitting inward and outward movement of the arcuate lever radially of the ratchet. The slide 212, and consequently the bar 218 and the aligning finger 226, are urged in a rearward direction, and the pawl urged in a clockwise direction, by a coil spring 254, Fig. 1, secured at one end to some fixed point of the machine, as for example to a pin set into the hopper casting. The coil spring at its forward end is secured to a long wire or rod 256 having at its forward end a hook 258, Fig. 6, received in an opening 280 (see Fig. 23) in a lateral lug 262 formed integrally with the slide 212.

Figure 18:
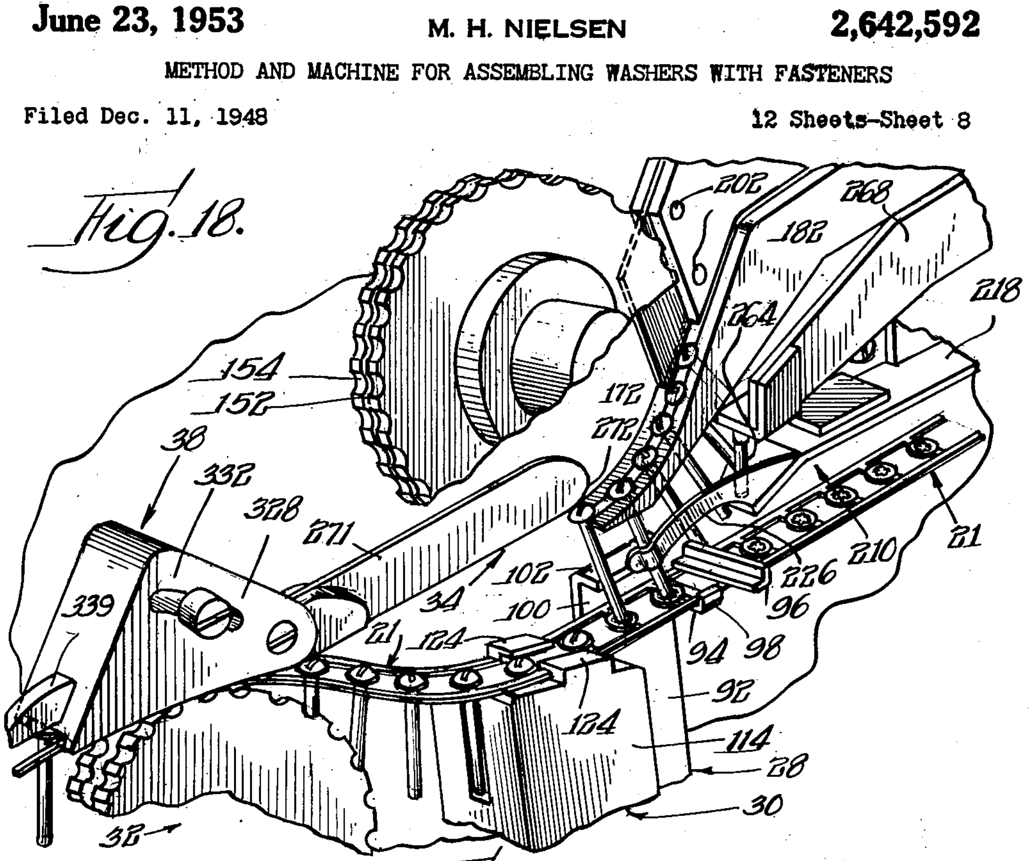
Fig. 18 is a fragmentary view in perspective illustrating the operation of the assembly mechanism.

The lateral deflection or yielding of the aligning finger 226 is controlled on its forward movement, and caused or controlled on its rearward movement, by a control member or pin 264, Figs. 18 and 22, depending from a bracket 266 secured to, or formed integrally with, the forward end of a bar 268 adjustably mounted by bolts, not shown, on the plate 84, the bar having slots 270 for receiving such bolts and permitting the adjustment of the bar on the plate 84 and relative to the slide 212 and aligning finger 226. Bar 268 is so adjusted that as the slide 212 moves forwardly and the assembly wheel brings the shank of a screw element opposite the inclined camming edge 104 of the lug 102, see Figs. 19 and 20, the aligning finger 226 is allowed to spring inwardly so that its hooked end 228 engages the shank of the screw element and forces the shank against the camming edge 104. The bar is so adjusted relative to the slide 212 that the hooked end of the finger is aligned with the screw shank, and the movement of the slot is so timed that it advances from behind, and laterally toward, the screw shank as it is opposite the cam edge 104, travels at a faster speed than the screws, and hence the free end of the finger picks up the screw shank and swings it to a precise position longitudinally of the washer strip before it reaches the aligning edge 106 of the lug 102 so that when the screw shank reaches the aligned edge 106 it is precisely aligned, both laterally and longitudinally of the washer strip, so as to project into the washer aperture.

The height of the teeth of the ratchet 230 is made such as to assure sufficient forward movement of the slide to cause the shanks of the screw blanks to be aligned with and to be projected into, or mesh with, the washer apertures by the time the tooth 232 of the operating lever or pawl clears the teeth of the ratchet, whereupon the spring 254 returns the slide and aligning finger with a snap action, and as the slide moves rearwardly the stationary control pin 264 causes outward lateral deflection or yielding of the finger 226 to permit engagement of the next following screw blank.

In some instances, particularly when assembling small screws with the washer strip, there is a tendency for the screws to adhere to the assembly wheel and not drop down into the washers as the screws leave the end of the chute fingers 190 and 192. Such adherence of the screws to the assembly wheel may be prevented, and the downward movement of the screws after leaving the chute fingers assured by providing a stripper or ejecting finger or lever 271, Figs. 6, 14, 15 and 18, projecting into the wheel between the feed disks 152 and 154. The strip finger 271 is mounted for pivotal adjustment, as will hereinafter appear, and is formed at its free end with a curved nose 272, the finger being pivotally adjusted to such position that as each screw element leaves the chute fingers 190 and 192 it engages the curved camming nose 272 and consequently when the head of the screw passes from the chute fingers and its movement is continued as by reason of the feeding action of the assembly wheel or the continuous advancement of the washer strip, the curved camming nose of the finger 271 cams the screw head out of the assembly wheel and applies a downward force on the screw so that it will be further telescoped with the washer strip. If for any reason the screw shank should have become cocked with respect to the washer after its initial projection thereinto, then camming nose 272 of the finger 271 will, by applying a downward pressure and a frictional retardation of the head of the shank, straighten the shank of the screw in the washer and start it on its downward movement through the washer, which movement is of course normally completed by the action of gravity on the screw, once the screw being freed from the screw chute has its shank properly aligned with respect to the washer aperture. Finger 271 further serves the important purpose of stripping the blanks from wheels 152 and 154 which might be retained thereon and be pulled out of the washer with which they are assembled.

As previously indicated, the possibility of misalignment of the shanks of the screw blanks with the washer apertures increases with increasing length of the screws. In assembling screw elements or blanks having relatively short shanks the assembly wheel and the chute fingers effect a sufficiently precise alignment of the screw blanks with the washer apertures of the strip, and applicant has found that in assembling such short screws with the washer strip the aligning and centralizing means 210 may be eliminated on replacement of the washer strip guide 28 by the washer strip guide 272, shown in Figs. 45 and 46. This washer strip guide 272 may comprise a plate 274 secured for vertical adjustment to the plate 84 as by bolts 276 received in slots 278, the plate 274 having at its upper end an outwardly turned flange 280 forming a supporting and guiding base for the washer strip. The plate 274 is adjusted vertically so that the washer strip is in close underlying relation to the thin tapered free end of the chute feed fingers 190 and 192 so that as the short shanks of the screw elements begin to project beneath the chute fingers they also project into the washer aperture, the assembly wheel being synchronized with the washer strip so that the shanks of the screw elements mesh with the washer apertures in a manner similar to the manner of the meshing of a sprocket with its driving or driven chain.

Figures 36, 37, 38, 45, 46:
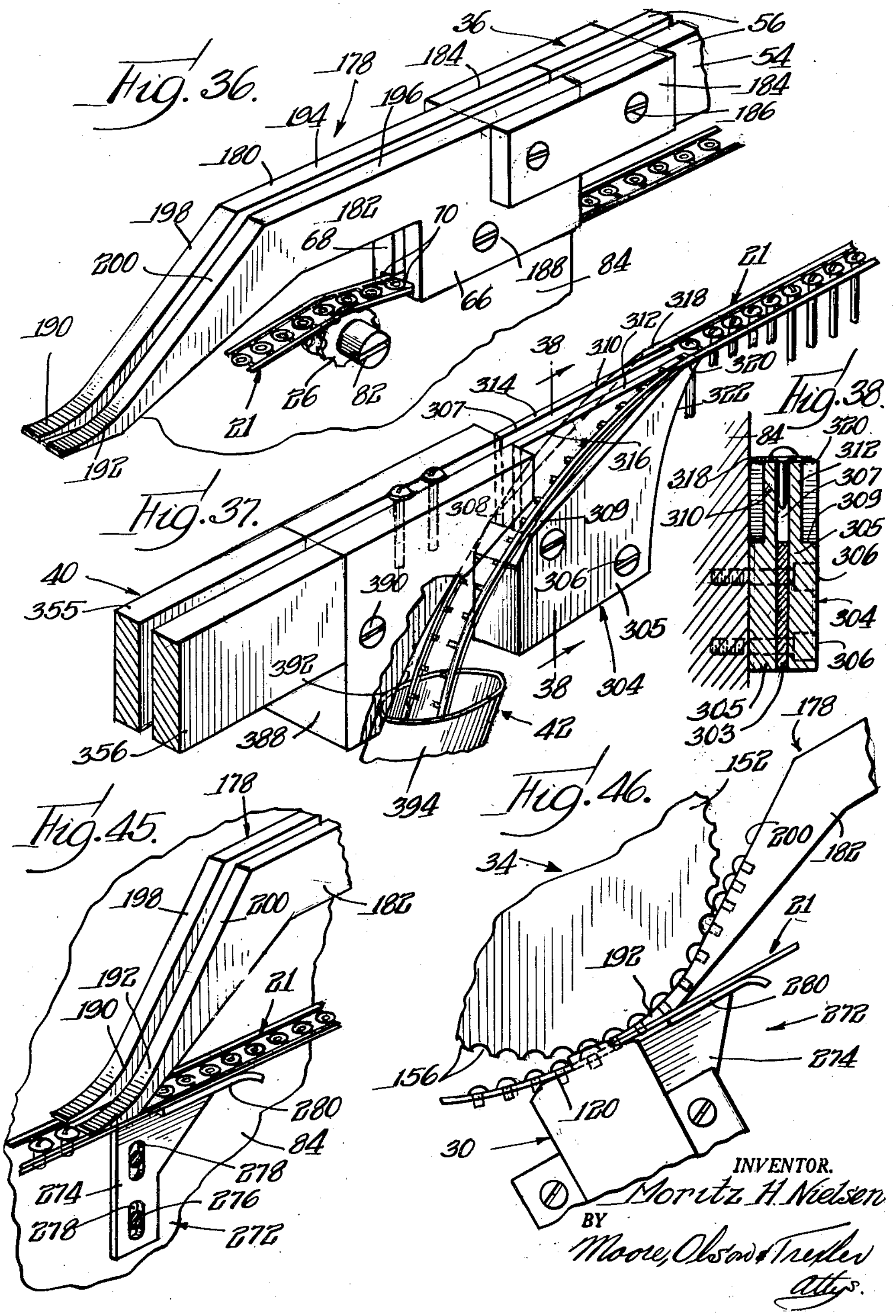
Fig. 36 is a detailed perspective view of means for feeding the screws and guiding the strip of washers to the assembly mechanism.
Fig. 37 is a detailed perspective view of the means for feeding the screws and washers and the waste material severed from the strip of washers along different paths.
Fig. 38 is a view in vertical section taken substantially along the line 38—38 of Fig. 37.
Figs. 45 and 46 illustrate the adjustment of the machine for the assembling of screws having very short shanks with a strip of washers and a modified strip supporting and guiding means useful in connection with the assembling of such short shank screws.

It should be noted that in assembling screws with such short shanks, the washer strip guide 30 is adjusted vertically to the position shown in Fig. 46, the strip hold-down and guide blocks 124 being brought into close proximity to the assembly wheel and the strip supporting and guiding surfaces 120 of the block lying substantially in the same plane as the upper surface of the strip supporting and guiding flange 280 of the plate 274.

*Washer strip severing means*

Figures 33, 34, 35:
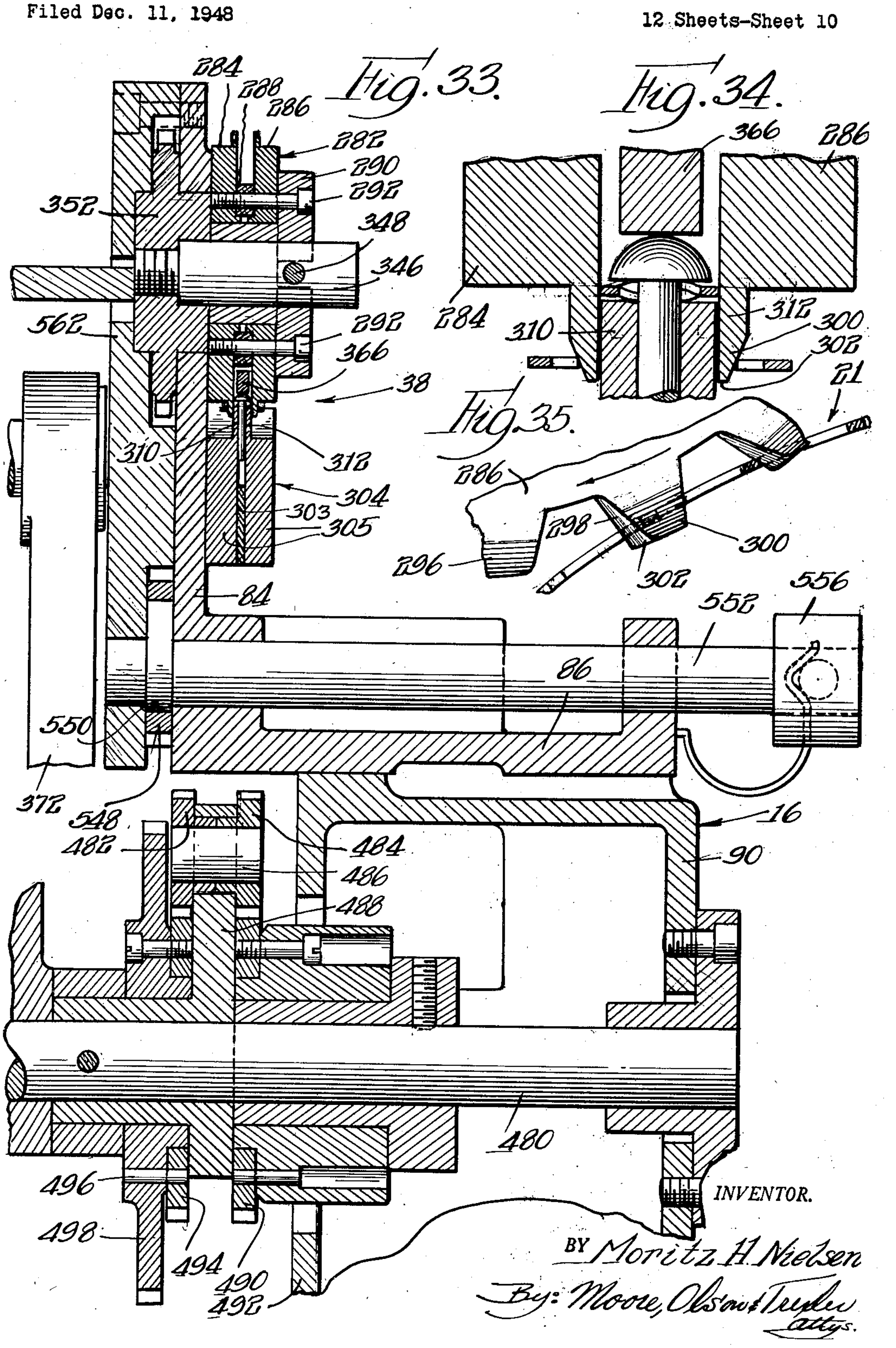
Fig. 33 is a fragmentary view in generally vertical section taken substantially along the line 33—33 of Fig. 1.
Fig. 34 is an enlarged view of a portion of Fig. 33.
Fig. 35 is a fragmentary view taken at right angles to Fig. 34 to illustrate the operation of the severing wheel of Figs. 33 and 34.

As shown in Figs. 1, 6, 33, 34 and 35, the washer strip severing means or device 38 comprises a cut-off roller 282 including a pair of cut-off rollers 284 and 286, Fig. 33, and a spacer ring or disk 288 of smaller diameter than the rollers 284 and 286. The rollers 284 and 286 with the spacer 288 interposed therebetween are fastened together and adjustably secured to a driving collar 290 as by bolts 292 received in the arcuate slots 294, Fig. 6, in driving collar 290. The cut-off rollers 284 and 286 are provided with aligned equally spaced cutting or shearing teeth 296 extending from the periphery of the rollers at the inner confronting faces thereof. Each tooth 296 is ground to provide a forward, relatively sharp, radial cutting or shearing edge 296, and a beveled end portion 300 terminating in a relatively blunt peripheral edge 302. The beveled surfaces tend to align the strip with the severing roll.

The cut-off rollers 284 and 286, and particularly the cutting and shearing teeth 296 thereof, cooperate with a combined shear block and feed chute 304, Figs. 1, 33, 34, 37 and 38. This device 304 preferably comprises blocks 305 with a spacer 303 secured to the plate 84 as by bolts 306, the block having a central slot or guideway 307 longitudinally thereof to receive the shanks of the screw element. The outer side surfaces of the blocks are milled or otherwise relieved to form inclined surfaces 308 and 309 on opposite sides of upstanding shear block plates 310 and 312, the upper edges of which form screw and washer support surfaces 314 and 316. The inclined surfaces 308 and 309 terminate at the upper end of the block inwardly of the rear end and the blocks at this end are provided with wider upper surfaces 318 and 320, which are somewhat wider than the washer strip and support the washer strip as it leaves the feed roller 32.

The blocks 305 are preferably provided with a curved rear surface 322 of a radius comparable to the radius of the roller 32 so that the blocks may be mounted in close relation to the feed roller and with their upper surfaces 318 and 320 positioned to act as a guide and support for the washer strip as it passes from the feed roller.

The surfaces 318 and 320 of the shear plates 310 and 312 also cooperate with a screw and washer strip hold-down and guide means 326 (Figs. 1, 6, 18, and 30 to 32) precisely to align the washer strip and the assembled screws and washers, both vertically and horizontally, with the severing rolls 284 and 286. This hold-down and guide 326, as best seen in Figs. 6 and 30, comprises a block 328 adjustably mounted on the plate 84 as by bolt 330 threaded into the plate and received in a slot 332 in the block 328. The bottom 334 of the block 328 is formed with a washer strip guide chute 336 communicating with a deeper slot 338 shaped in cross section in conformity with the shape of the heads of the screws which it is desired to assemble. The longitudinally extending sidewalls of the slot 336 serve precisely to align the strip horizontally relative to the strip feed roll 32 and the strip severing rolls 284 and 286. The upper wall of the slot 336, which is slightly curved longitudinally of the block 328, serves in the first instance to direct the strip onto the feed roll and maintain it in engagement therewith, and also serves to maintain the strip on the strip supporting and guiding surfaces 318 and 320 of the anvil block 305, and thereby in cooperation with the anvil block precisely align the strip vertically with respect to the severing rolls.

A screw hold-down lug or guide finger 339 is formed integrally with the block 328 and projects forwardly therefrom and into the space between the severing rolls 284 and 286. The block 328 is mounted and shaped so that its forward wall 340 extends in close relation to the periphery of the severing rolls and rests at its forward end on the shear blocks 305.

The slightly curved top wall of the slot 336 also serves by engaging the head of a screw element which may not have been fully telescoped with the washer of the strip to press the screw element into final telescoped relation with the washer.

The block 328 also forms a support or mount for the stripper or ejector finger 271 of the assembly mechanism. For that purpose, the rear end of the block 328 is bifurcated and receives between the furcation 342 the widened rear end of the finger 271, the finger being pivotally mounted on a bolt 344 threaded into one of the furcations and passing through an aperture in the other furcation so that on tightening of the bolt the finger 271 is clamped in a pivoted, adjusted position by the furcations 342. It should be noted that the rear end of the finger 271 is curved as at 346, Fig. 31, the curve being eccentric to the axis of the pivot bolt 344 and the end 346 therefore engaging the rear surface of the block between the furcations to limit the downward pivotal adjustment of the stripper finger and also form a continuous surface with the wall of slot 336 so that no recess or opening is present between the finger 271 and the block 328.

From the washer strip supporting surfaces 318 and 320, the strip passes onto the thin shear block plates 310 and 312 which are of a thickness and spacing such that these plates support the washers but leave unsupported the side margins or waste strips 74 and 76 and also leave unsupported the connecting pieces, tabs, or feed links 78 and 80 by which the side margins are connected to the washers. The shearing rolls 284 and 286 are spaced apart by the spacer ring or disk 288 a distance equal to the external diameter of the washers and the shear block plates 310 and 312 project into the space between the shearing or cutting rolls in sufficiently close relation to the inner faces of the teeth of the rolls to form shear blades for the cutting teeth.

The rolls 284 and 286 are driven through the drive collar 290 as previously indicated, this collar being driven by the shaft 346 through a pin 348, Figs. 6 and 33. Pin 348 is carried by the shaft and received in a diametrical slot 350 in the outer face of the collar. Pin 348 is mounted in shaft 346 so as to permit side movement of the shearing roller relative to the shearing blocks 305. The stud 340 is threaded at its rear end into the hub of a drive gear 352 journaled in the plate 84. The shearing or severing roll 282 is driven continuously in definite speed relation to the feed roll 32 at a higher peripheral speed than the speed of movement or feed of the washer strip. The severing roll is so phased, by angular adjustment of the roll on the collar, relative to the continuously moving washer strip that each connecting tab will be first engaged at its upper rear edge by the sharp, leading cutting edge 298 of a tooth of the roll and adjacent the outer end of the tooth. The cutting edges 298 of opposite teeth therefore apply a downward shearing force on the connecting tab, and the beveled surfaces 360 apply substantial downward and outward pressures through the connecting tabs to the side margins or waste strips and force them downwardly alongside the stationary shear plates 310 and 312, as indicated in Figs. 6, 33, 34 and 35. Each washer and screw assembled therewith is thereby freed from the strip for movement downwardly along the inclined upper edges 314 and 316 of the shear block. This feed movement of the screws and washers is facilitated by the frictional engagement of the inner faces of the teeth of the clockwise rotating severing roll with the margins of the washers.

The phasing adjustment of the rolls on the collar may be facilitated by cooperating scales 353 and 354 (Fig. 6) on the outer roll and the collar.

*Feed means for the assembled screw and washer units*

The feed means or chute 40 comprises, as best seen in Figs. 1, 2, 6, and 37 to 43, a pair of laterally spaced chute bars 355 and 356 similar to the feed chute bars 54 and 56 and mounted by the usual or any suitable brackets, as for example the bracket 358, on the auxiliary body 4 of the thread rolling machine. The chute bars 355 and 356 abut at their lower end a pair of guide blocks 360 and 362, having their confronting faces inclined to the chute bars 355 and 356 to form a guideway 361 extending at an obtuse angle to the guideway formed by the chute bars 355 and 356 for delivering assembled screw blanks and washers by gravity directly to the thread rolling dies 10 and 12 and the starter mechanism 13. In prior thread rolling machines of this type, the assembled screws and washers have been delivered to the thread rolling dies and the starter mechanism by a transfer mechanism or blade operating at right angles to the feed chute and pushing the leading unit at the bottom of the dies in front of the starter mechanism and while so moving acting as a gate restraining the succeeding line of units in the feed chute. Such a transfer mechanism, however, particularly in the case of smaller units, frequently fails to pick up a unit from the feed chute and accordingly fails to deliver a unit to the thread rolling dies so that the efficiency of the thread rolling machine in respect to the number of units processed in a given period of time is greatly lowered. In the embodiment of the machine shown in this application, the assembled units are, however, delivered directly to the starter mechanism 13 and this mechanism by suitable modification of the drive mechanism of the machine is made to control the feeding of the units into the thread rolling mechanism and the processing of a unit on each operation of the thread rolling dies is thereby assured.

The feed means 40 also comprises a cover bar 364 secured in the usual manner to the thread rolling machine and extending longitudinally over the guideway formed by the spaced chute bars 355 and 356. At its rear end the cover bar is reduced in thickness and the end portion 366 projects into the severing roll between its severing disks 284 and 286, the end portion 366 terminating in close juxtaposition to the forwardly projecting lug 339 of the block 328 and the under surface of this end portion of the cover bar acts as a stripper finger preventing the assembled units from being lifted out of the shear plates 310 and 312, and freeing the assembled units from the continuously rotating severing disks 284 and 286. At its forward or lower end 368, Figs. 2 and 39, cover bar 364 is bent at an obtuse angle so as to overlie the guideway formed by the blocks 360 and 362.

*Thread rolling dies and starter mechanism*

The thread rolling die 10, Figs. 2, 3, 39 and 43, is the usual reciprocating die of the standard thread rolling machine carried by the usual slide 370 and operatively connected by the pitman 327, Fig. 3, to the face of the continuously rotating gear 374 and enclosed within the housing 376. The die 12 is a stationary die of a standard thread rolling machine mounted in the usual manner on the auxiliary base 4.

Starter mechanism 13 includes the usual starting finger 378 of the standard thread rolling machine, the starter finger being formed at the forward end of a slide bar 380 (Figs. 4 and 5) having at its rear end a stud 382 secured to an arm 384 secured to the driving shaft 386. In the standard machine this starter finger serves merely to push the screw in the direction of the forward movement of the reciprocating die so that it will not merely remain at the rear end of the stationary die but will be advanced and rotated by the forward movement of the reciprocating die. In the present machine, however, the starter finger serves not only that function but also to regulate the individual feeding of the assembled units to the dies and to maintain the line of units in the gravity feed chute.

*The waste material guide or feed means and the waste cutting means*

The waste material guide or feed means 42 (Figs. 1, 6, and 37) comprises a block 388 interposed between the bars 355 and 356 of the feed chute 40 and the chute bars or shear plates 310 and 312 of the block 305. The block 388 is also secured to the plate 84 as by a bolt 390 and is centrally slotted so that its upper portion forms a connecting feed chute between the plates 310 and 312 and the chute bars 354 and 356 and its rear end is formed with a relatively deep curved slot so that the curved base wall 392, Fig. 37, of the slot forms a waste material guide directing the waste strips downwardly while the sidewalls (not shown) of the slot serve to confine the waste strips laterally of their path of movement and so direct them into the upper open mouth of a curved pipe or conduit 394 which extends downwardly to an opening 396 in the block 90 of the casting 16, best seen in Fig. 10.

The waste strips are delivered through the opening 396 to the waste cutting means 44 (Figs. 1, 4 and 9 to 12) which comprises stationary cutting or shearing blades 398 and 400 in the form of rings bolted to the bottom of the block 90 of the casting 16 and in communication with the opening 396. The stationary blades 398 and 400 form a guide for and cooperate with a movable breaking or shearing blade 402 having eyelet 404 at its rear end, which eyelet receives a pivot pin 406 by which the blade is mounted on an operating lever 408. The rear end of the lever is mounted on eccentric disk 410 secured to a driving shaft 412 secured in a bracket 414 formed integrally with and depending from the casting 16. As the eccentric 410 is rotated the lever 408 is moved backwardly and forwardly to alternately align and disalign openings 403 and 405 with the openings in the stationary shear blades 398 and 400, so that the waste strips pass through them, and then across the openings so as to break small pieces from the strip. The small pieces when broken from the strip fall from the cutting means into a pan-like trough 416 from which they fall into a suitable waste pan, not shown.

*The drive mechanism and connections*

As shown in Figs. 2, 4, 5, 9, 13, 14, 16, 17 and 33, the driving mechanism 14 and connections therefrom to the additional and substitute mechanisms and the displaced screw feed mechanism 8 comprise a drive motor 418, Fig. 4, supported in any convenient manner, as on its own separate base or on a base secured to pedestal 2. The motor 418 drives a pulley 420 connected by a belt 422 to a large pulley 424 keyed to the main drive shaft 426 of the standard thread rolling machine. The drive shaft 426 is provided with a gear 428 which meshes with the large gear 374 that drives the reciprocating thread rolling die 10. The shaft also carries a pulley 430, Fig. 2, connected by a belt 432 to a pulley 434 secured to a shaft 436, Fig. 4, journaled in a bracket 438 fastened to and upstanding from the auxiliary base or body 4. The shaft 436 also carries a pulley 440 connected by belt 442 to a pulley 444 mounted on the drive shaft 62 for the clearance wheel 58.

The drive gear 374 for the thread rolling die 10 is secured to a shaft 446 journaled in the auxiliary base or body 4. Up to this point the drive mechanism is essentially the drive mechanism of the standard thread rolling machine. In that machine a cam on shaft 446 drove the starter mechanism 13 and was shaped to cause the starter finger to remain in its rearward position through approximately 260 degreees of rotation of the shaft; to move forwardly through 75 degrees of rotation and return to its rearward position during the remaining 25 degrees of rotation of the shaft. This enabled the starter finger to remain in its rearward position during the transfer of a screw to the dies when the reciprocating die was moving rearwardly, then to advance with that die during the initial portion of its forward movement so as to push the screw into the dies, and then to return very quickly to its rear position.

As previously indicated, the transfer mechanism of the standard machine, which reciprocated at right angles to the screw feed chute and the dies, frequently failed in its transfer function, that is, to pick up a screw from the chute and deliver one screw to the dies for each reciprocation thereof. In the present machine the standard starter mechanism drive cam is replaced by a cam 448 also secured to the shaft 446 but of different form, as shown in Figs. 4 and 5, to cause the starter finger normally to rest in its forward position covering the guideway 361 so as to retain the line of the screws in the guideway. As the reciprocating die passes through the point of reversal at its rear limit of movement the starter finger is now quickly moved rearwardly to uncover the guideway and permit the leading screw in the guideway to fall into position in front of the finger and against the reciprocating die with its head resting on the reciprocating die and on the end of the starter finger. Then as the reciprocating die begins to move forward the starter finger is quickly returned to its forward position causing the screw to move forwardly with the die and to be pushed into the space between the reciprocating die and the stationary die, the stationary die having the usual outwardly flared rear end to facilitate this quick injection of the screw into the space between the dies. The starter finger does not, however, as formerly, immediately return to its rearmost position but remains substantially in its forward position, or at least sufficiently forward to close the guideway until the reciprocating die again approaches its rearmost limit of movement. The cam 448 is connected, as in the standard thread rolling machine, to the starter mechanism by a lever 450 pivoted at its lower end and provided intermediately with a cam roller 452. The lever is connected at its upper end by a rod 454 to a lever 456 mounted on the outer end of the starter finger drive shaft 386. The lever 450 is urged in a clockwise direction and the starter finger moved forwardly by a coil spring 458 secured at one end of the lever and at the other end to a suitable stud or pin secured to the auxiliary base or body 4 or to the bracket 438 on which the shaft 386 is mounted.

The reciprocating plate 52 of the screw feed mechanism 8 is connected to the usual driving disk 460 fastened to a drive shaft 462 journaled in a bracket carried by the casting 16, the disk 460 driving the plate 52 through the pitman 464. The shaft 462 carries at its outer end a drive gear 466. Gear 466 is driven through a chain of gears 468, 470 and 472 by means of a driving gear 474 on the shaft 446. The gears 468, 470 and 472 may be mounted in any convenient manner on shafts 476, 478 and 480 journaled in the casting 16 or in suitable brackets secured to said casting.

Figures 9, 10, 11, 12:
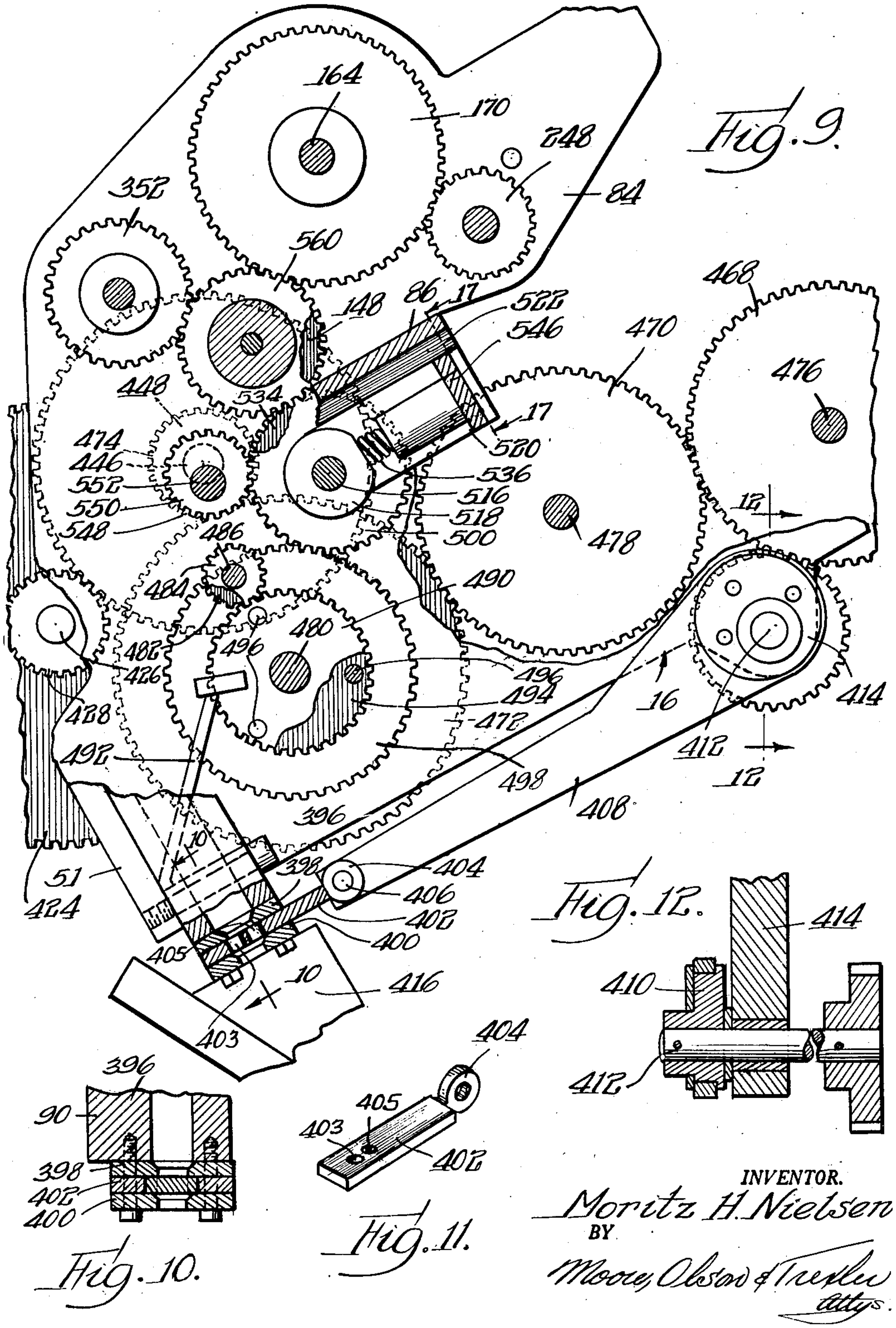
Fig. 9 is a fragmentary view in vertical section taken substantially along the line 9—9 of Fig. 2 but with numerous parts broken away to show underlying parts.
Fig. 10 is a fragmentary view in generally vertical section taken substantially along the line 10—10 of Fig. 9.
Fig. 11 is a view in perspective of a shearing knife blade.
Fig. 12 is a fragmentary view in vertical section taken substantially along the line 12—12 of Fig. 9.
Figure 13:
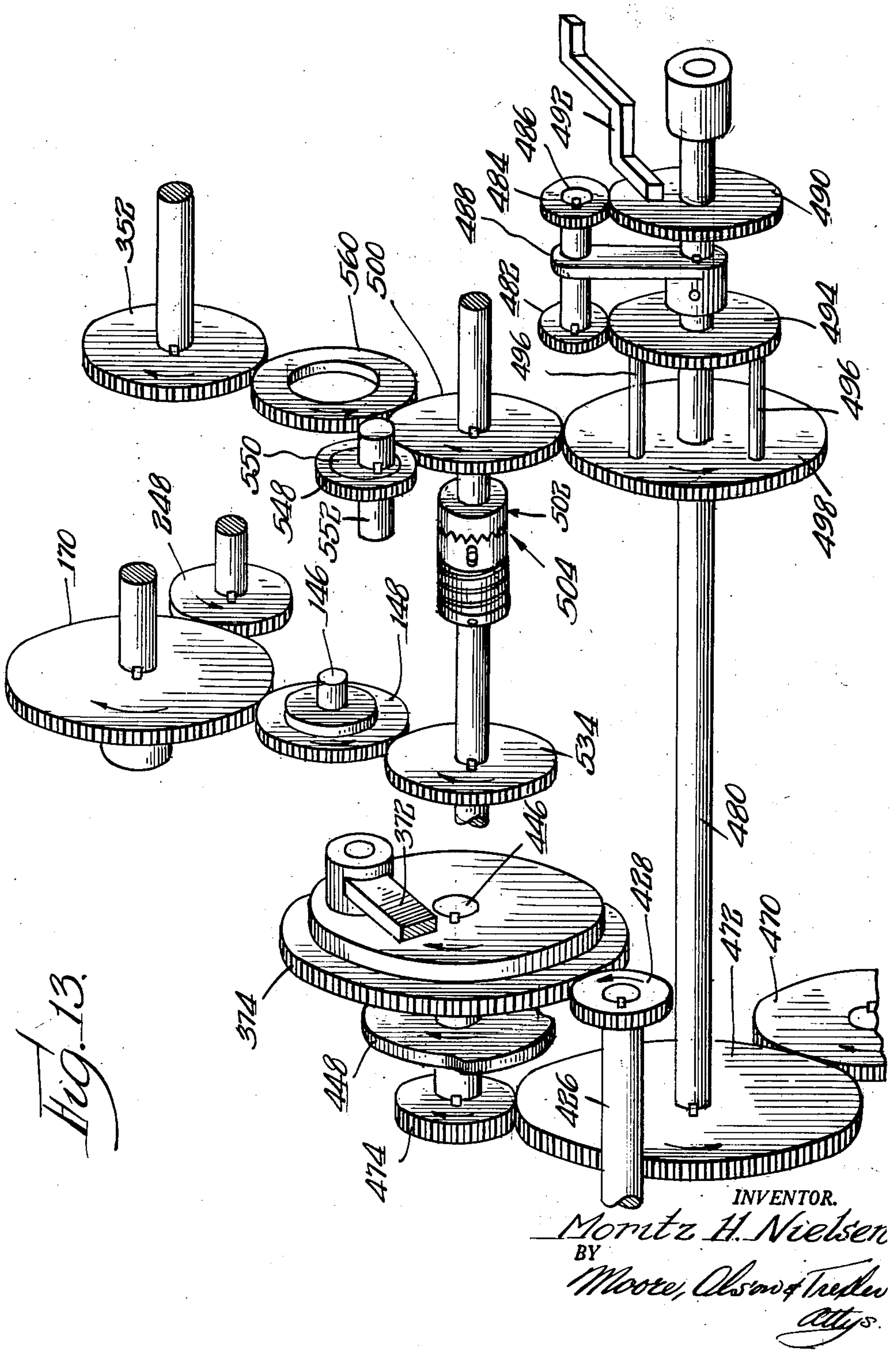
Fig. 13 is a diagrammatic view in perspective of a portion of the drive mechanism for better illustrating the same.

A pair of traveling or planetary gears 482 and 484, Figs. 9 and 13, are keyed to the opposite ends of a common shaft 486 carried by a bracket or lever 488 keyed to the shaft 480. The gear 484 meshes with and travels about a stationary gear 490 which is loose on the shaft 480 and is held against rotation as by a bracket 492 fastened to the gear and to the flange 51 of the auxiliary base or body 4.

The planetary gear 482 meshes with and drives a gear 494 loose on the shaft 480 but secured by rods 496 to a gear 498, also loose on the shaft 480. The system of gears 482, 484, 490 and 494 provides a compact speed reducing drive mechanism causing a speed reduction of approximately 16 to 1 between the shaft 480 and the gear 498, without using any gears of large size.

Figures 14, 15, 16, 17:
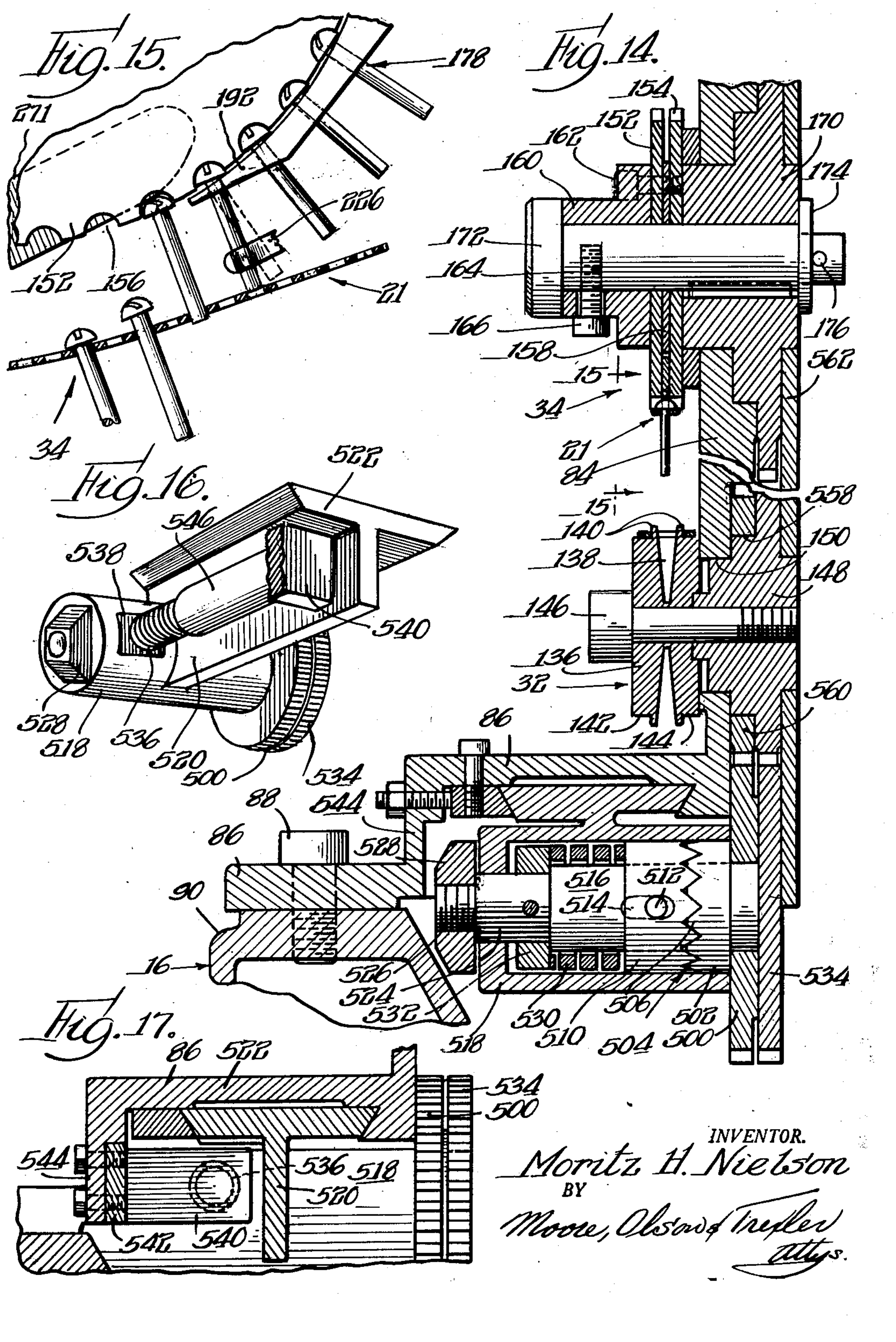
Fig. 14 is a fragmentary view in generally vertical section taken substantially along the line 14—14 of Fig. 1.
Fig. 15 is a view in elevation and partly in vertical section taken substantially along the line 15—15 of Fig. 14.
Fig. 16 is a fragmentary view in perspective of a yieldable mounting for part of the drive mechanism.
Fig. 17 is a fragmentary view in generally vertical section taken substantially along the line 17—17 of Fig. 9.

The gear 498 drives a gear 500 having an apertured hub portion 502, Fig. 14. The hub portion 502 forms one part of a clutch 504, the hub portion 502 having axially directed generally V-shaped clutch teeth 506. The clutch teeth 506 of the clutch member 502 mate with like clutch teeth 508 of a clutch member 510 in the form of a collar. A cross pin 512 press fitted or otherwise secured to the collar is received in a longitudinal slot 514 in a stud 516. The hub 502 of the gear 500 is journaled in a hollow boss 518 formed as an integral part of the depending flange 520 of a slide 522 slidably mounted in the guideway formed in the under surface of the mounting plate 86. The stud 516 has a reduced portion 524 journaled in the outer end wall of the boss 518 and a further reduced threaded end portion 526 on which is threaded a nut 528. A clutch spring 530 is interposed between the clutch collar 510 and the collar 532 pinned to the reduced portion 524 of the stud 516. The stud 516 projects through the hollow hub 502 and the gear 500 and has secured to its outer end a gear 534. The slide 522 is normally urged forwardly, to cause the gear 500 to mesh with the gear 498, by a coil spring 536 interposed between a flat surface 538 on the boss 518 and the lateral arm 540, Figs. 16 and 17, of a bracket 542 bolted to a flange 544 of the plate 86.

A spring housing tube 546 is preferably welded or otherwise fastened to the flange 540 and projects forwardly therefrom toward the boss 518 sufficiently to hold the spring in position and yet permit it to compress and allow movement of the slide and the boss 518 to the right, as seen in Fig. 9.

The gear 500 meshes with an idler gear 548, Figs. 9 and 13, journaled on an eccentric disk 550 keyed to a control shaft 552. The control shaft 552 is journaled in a bracket 554 fastened to the plate 86, see Figs. 1 and 2. A control lever 556 is secured to the outer end of the control shaft 552 so that on swinging of the lever the shaft 552 and eccentric 550 are turned, swinging the gear 548 toward the shaft 502, thereby forcing the gear 500 out of mesh with the gear 498.

The gear 534 operates the drive gear 148 for the washer feed roller 136. The gear 148 is formed with a reduced hub portion 558, Fig. 14, on which is journaled a gear 560, which operates the drive gear 352 for the severing rolls 284 and 286. Drive gear 148 in turn operates the drive gear 170 for the feed or assembly disks 152 and 154. The gear 170 also operates the drive gear 248 for the ratchet 230.

It will be clear that if for any reason the movement of the washer strip or the assembly of the screw blanks with the washer strip is interfered with the clutch 504 will yield, breaking the driving connection to the strip feed device 32, the assembly mechanism 34 and the screw aligning or centralizing means 210.

The chute 40 forms a reservoir for the thread rolling dies and it may at times happen that this reservoir becomes filled or so substantially filled that the assembly operations should be momentarily discontinued while permitting the thread rolling operations to continue in order to reduce the stock of assembled screw blanks and washers that is in such reservoir. Accordingly, the operator may swing the lever 556 thereby disengaging the gear 500 from the gear 498 so that the assembling operaton and the strip feeding operation and the severing operation are terminated while the thread rolling operation is continued. If the condition is not observed by the operator, then it would be apparent that the chute 40 will become filled and the continuous movement of the strip interfered with by the accumulation of assembled units in the chute 40. The clutch 504 will accordingly be automatically released, as previously indicated, thereby stopping the strip feeding and assembling operations, although allowing the severing wheel to continue its rotation. This continued operation of the severing roll, however, causes no damage to the machine for it then continues to revolve freely without performing any severing function.

The various drive gears 148, 170, 248, 352, 500, 534, 560, and the control gear 548 are enclosed within a housing 562, Figs. 2, 4, 14, and 33, bolted to the plate 84.

*Operation of the machine*

In the operation of the machine, screw blanks are fed from the hopper or container 6 (Fig. 1) by the reciprocating plate 52 to the inclined guide chute 36, the feeding action being regulated by the clearance wheel 58 so that only screws properly registering with the chute will pass from the hopper. The screw blanks pass down the inclined guide chute 36 under the action of gravity and are delivered by the chute to the assembly mechanism 34. From the chute 36 the screw blanks pass by gravity to the chute 178 of the assembly mechanism, whence the screw blanks gravitate down the chute toward the arcuate fingers 190 and 192 (Fig. 6), and while sliding down the initial part of these fingers they are picked up by the notches 156 of the assembly wheel. The washer strip 21 is fed continuously by the feed device 32 from the roll 20 over and through the guides 22, 24, 26, 28 and 30, past the assembly wheel.

Figures 19, 20:
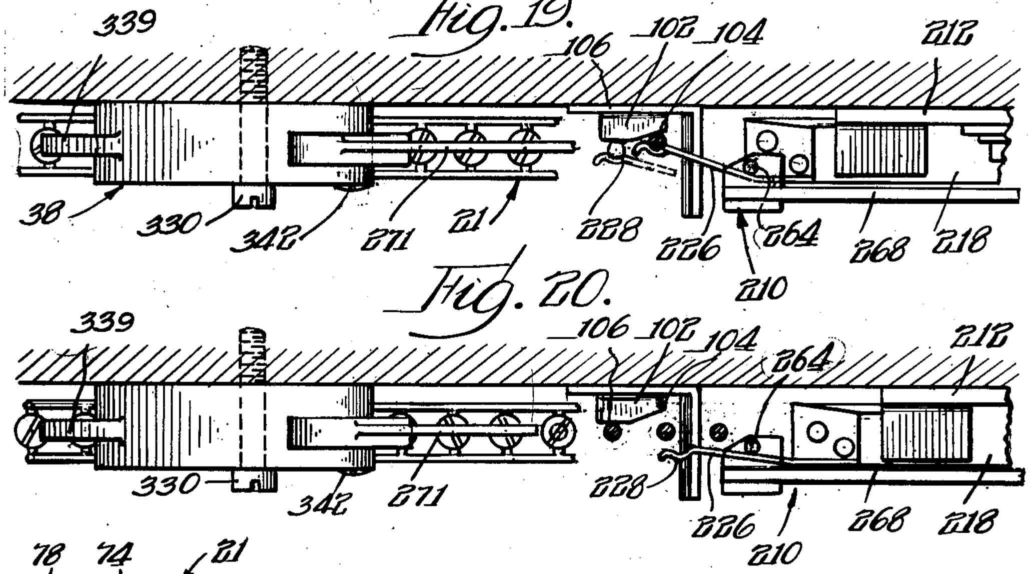
Figs. 19 and 20 are fragmentary plan views illustrating the operation of devices for aligning the shanks of long screws with the washer strip.

The strip feeding device 32 and the assembly wheel are continuously operated in proper synchronism, and in adjusted phase relation, so that if the ends of the shanks of the screw blanks are in proper angular position with respect to the strip, the washers and the screw shanks mesh one with the other in the manner of a sprocket and chain and are automatically assembled by the continuous advancing movement of the elements. The shank aligning and centralizing means 210 is operated by the ratchet 230 in proper timed relation with the feeding of the washer strip and the screw blanks. As shown in Figs. 19 and 20, when each washer approaches the position in which it should mesh with the free end of the shank of a screw blank, the resilient aligning finger 226 picks up a screw shank while opposite the cam lug 102 and cooperates with it to centralize the shank both literally and longitudinally of the washer strip, properly to mesh with the advancing washer.

If the screw blanks should be so tilted in the chute fingers 190 and 192 and the recess 156 of the assembly wheel that the end of the shank lies in advance of the position which it should occupy as it approaches the assembly point, the shank will engage the cam lug 102 sooner than it should and will be retarded thereby so as to be picked up by the resilient aligning finger 226 and thereupon properly centralized and aligned for automatic meshing with the washer. As soon as the free end of the shank has meshed within the washer, the spring 256 is permitted by the ratchet 230 to return the slide 212 rearwardly with a snap action, the engagement of the free end of the shank in the strip and the forward feeding of the strip and of the screw blank and the shaping of the hooked end 228 of the resilient finger 226 insuring quick release of the screw from the resilient finger. The stationary control pin 264 causes outward lateral deflection of the finger as it moves rearwardly so that it passes the next following screw. It should be noted that the distance of movement of the screw during the time that it is engaged by the aligning finger 226 is relatively very short, the stationary pin 264 holding the spring finger laterally out of the path of the screw element until just prior to the instant that the element should be aligned for meshing with the washer and the stop then permitting the finger in its forward movement to yield inwardly sufficiently for the hook end 228 to move sidewise into engagement with the shank of the screw blank.

After the screw blank has initially meshed with a washer, the head of the blank is engaged by the camming nose 272 (Fig. 6) of the stripper finger 271 just at the instant that the head of the screw blank passes beyond the fingers 190 and 192 and the further movement of the screw blank with the washer strip carries the head of the screw along the camming nose so that the action of gravity tending to cause the screw to drop down through the washer is facilitated by the camming nose.

As the feed device 32 continues to move the assembled units are carried, as part of the strip, to the hold-down and guide 326 (Fig. 6) which, as previously described, presses any screw which may not have been fully seated in the washer into the full seated position and precisely aligns the strip for the action of the severing device 38. As previously described, the rolls of the severing device sweep down on the connecting tabs or pieces 76 and 80, by which each washer is attached to the side margins of the strip, and shear them off against the combined shear and feed plates 310 and 312 and in the action of severing applies downward pressure deflecting the strip below the surfaces 314 and 316 of the shear plates. The severing device also, as previously described, tends to apply a forward feeding force to the severed washers of the assembled units so that they are given an impetus down the plates 310 and 312. The assembled units then freely gravitate down the feed surface of the block 388 and along and down the chute 40 from which they pass to the laterally, as well as vertically, inclined guideway 361 (Figs. 40 to 43). The end of this guideway is covered and uncovered by the starter finger 378 in proper timed relation to the reciprocation of the thread rolling die 10 so that as that die approaches its rearward position the starter finger moves rearwardly sufficiently to release the screw shank of the leading assembled unit, allowing it to gravitate into position in advance of the starter finger, as shown in Fig. 41, and rest with the washer and the head of the screw blank on the reciprocating thread rolling die, on the starter finger and on the upper end of the stationary die 12. As the thread rolling die then begins its forward movement, the starter finger moves forward with a very quick action, closing the guideway 361 and forcing the screw shank of the assembled unit along the stationary die so that the reciprocating die causes the assembled unit to rotate rapidly as it moves forwardly along the stationary die and hence forms in the usual manner a rolled thread on the screw shank.

It will be evident that other means than thread rolling dies may be employed to enlarge a portion of the screw shank just beneath the washer so that an enlarged or extruded portion, other than the thread, holds the washer permanently on the screw.

When the die has completed its forward movement the screw is carried beyond the stationary die and falls off into any suitable receptacle or container positioned therebelow.

It will be seen from the foregoing description that applicant has provided a machine for making unit assemblies of a threaded fastener and a washer, specifically small screw and washer units or the like, at a much higher rate of production than heretofore possible; a method, machine or mechanism for assembling screws and washers or like fasteners at a continuous, uniform rate or speed such as to make full utilization of the capacity of the thread rolling mechanism or machine; an assembly machine in which the washers in strip form may be fed continuously at a uniform rate and while moving at said rate telescoped with screw elements or blanks, thereby greatly increasing the rate of assembly of the screws and washers; in a screw and washer machine of the type in which the washers are fed in strip form to the assembly mechanism or station, means operable upon the strip of washers after the screw elements have been assembled with the strip continuously to sever the washers from the strip without interference with the continuous feeding of the washer strip or the continuous operation of the assembly mechanism; a method and means for making assembled screws and washer units of the very smallest sizes; and a screw forming machine, preferably a thread rolling machine, including a feed roller having teeth engaging the tabs of a specially designed strip of washers to feed the strip from a roll in the direction of a screw feeding chute; means for telescoping screw elements with the strip while it is being fed; means which, while the washers are over the chute, sever them from the strip; and means for feeding the assembled screws and washers after severance from the strip to a screw forming or thread rolling device which so forms the screw element, or a thread thereon, as permanently to retain the washers on the screw elements.

For purposes of illustration specific forms of washers have been disclosed in the drawings, however, it should be understood that the term washers as used in the specification and claims is not limited to the above mentioned specific forms, but is employed in the broadest sense to include other sheet metal parts apertured to accommodate a rotary threaded fastener.

It will be obvious that changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. A method of making unit assemblies of a fastener having a washer receiving portion and a washer, said method comprising feeding longitudinally a strip having longitudinally spaced washers connected to a longitudinally extending ribbon-like portion by connecting tabs, feeding fasteners having washer receiving portions along an arcuate path in the direction of feed of the washer carrying strip and generally tangential to the path of feed of the strip to cause the washer receiving portions of the fasteners to mesh with the washers as the washer strip is moving, and thereafter successively severing the connecting tabs to detach the assembled washer and fastener units from the strip.

2. A machine for making unit assemblies of a fastener having a washer receiving portion and a washer, said machine comprising means for continuously feeding longitudinally a strip having washers attached in spaced relation by connecting tabs to a longitudinally extending ribbon, means for continuously feeding a succession of fasteners along a path in which the washer receiving portions of the fasteners mesh with the washers as the strip is moving, and means to which the washer strip is fed after meshing of the fasteners with the washers for severing the connecting tabs to detach the washer and fastener unit from the strip.

3. In a machine for making unit assemblies of a fastener and a washer comprising means for receiving a strip of washers, each connected to the strip by a tab of limited cross section, means for feeding the strip of washers from said receiving means continuously past an assembly location and to a severing location, fastener feeding means constructed and arranged to mesh the fasteners with the washers as the strip is moving past said assembly location, and means at the severing location for severing each tab of the moving strip as the strip reaches said severing location.

4. In a machine for making unit assemblies of a washer and a fastener having a washer receiving portion, said machine comprising means for receiving a strip of washers, each connected to the strip by a tab of limited cross section, means for feeding the strip of washers from said receiving means continuously past an assembly location and to a severing location, fastener feeding means constructed and arranged to mesh the washer receiving portions of the fastener with the washers as the strip is moving past said assembly location, cutting means at the severing location for cutting through each tab of the moving strip as the strip reaches said severing location, and actuator means for driving said strip feeding means, said fastener feeding means, and said cutting means in synchronism.

5. In a machine for making unit assemblies of a headed fastener and a washer comprising means for rotatably supporting a rolled strip of washers having washers in longitudinally spaced relation, guide means through which the strip of washers passes from the roll, said guide means having a longitudinal channel for guiding the strip of washers and openings above and below said channel for receiving the shank and head of each fastener, a device for feeding said strip continuously at a constant uniform rate from the roll through the guide channel of said guide means, and means for continuously feeding the headed fasteners along a path such that the shanks of the fasteners mesh with the apertures of the moving washers as the moving strip of washers passes through the guide channel of said guide means.

6. A machine for making unit assemblies of a screw element and washer comprising a feeding chute for receiving assembled screw element and washer units, means for continuously feeding in the direction of the chute at the upper portion thereof a strip of assembled screw and washer units, means for severing the units from the strip as the strip is moving along the upper portion of the chute, and means receiving the individual units from the lower end of the chute for enlarging the shank portion of each screw element permanently to retain the washer on the screw element.

7. A method of making unit assemblies of a screw and washer comprising moving continuously a strip of washers each connected to a continuous side margin of the strip by a connecting tab of limited cross section, feeding the screws continuously along a curved path to mesh with the holes in the washers of the strip as the strip is moving, holding the washer in which the shank of a screw has been inserted against movement laterally of the washer strip while severing the tab connecting the washer to the side margin of the strip.

8. In a machine for making unit assemblies of a screw element and a washer, means for continuously feeding a strip of washers at a uniform constant rate, means for continuously feeding screw elements in succession at said constant rate along a path converging with the strip to mesh the shanks of the screw elements with successive washers of the strip, a rotary cutting wheel positioned in the path of movement of the strip to sever the washers from the continuously moving strip after assembly of the screw elements with the washers, and means for driving said washer feeding means and said screw feeding means and said wheel in synchronism.

9. In a machine for making unit assemblies of a screw element and a washer, means including an arcuate guide for guiding screw elements along an arcuate path with the free ends of the shanks projecting from the guide, means for continuously feeding a strip of washers generally tangential to said arcuate path of the screw elements, means for feeding the screw elements along said guide in synchronism with said strip of washers to cause the free ends of the shanks of the screw elements to mesh with the apertures of the moving washers, means including a shiftably mounted member operable in timed relation to the strip feeding means and the screw feeding means for precisely aligning the free end of the shank of each screw element with a washer aperture as the end of the shank approaches the plane of the moving strip to insure meshing of the free end of the shank in the washer aperture, and means for thereafter severing the washers from the strip.

10. In a machine for making unit assemblies of a washer and a rotary fastener having a washer receiving shank portion, an assembly wheel having spaced peripheral notches for receiving the heads of the fasteners, a feeding chute having an arcuate portion concentric with said wheel and extending adjacent a portion of the periphery of said wheel to support the heads of the fasteners received in the notches of the wheel, said chute also having an inclined portion merging into the arcuate chute portion at the upper end of the latter for directing the fasteners through said arcuate chute portion and positioning the heads of said fasteners in the wheel notches, said arcuate portion of the feed chute being less in height at its free end than the shank portions of the fasteners, means for continuously feeding at a constant rate a strip of washers along a path generally tangential to the path described by the free ends of the shank portions of the fasteners but intersecting the said path adjacent the free end of the arcuate chute portion, and means for driving said assembly wheel and said strip feeding means synchronously whereby the shank portions of the fasteners mesh with the apertures of the washers of the moving strip of washers as the fasteners approach said free end of the arcuate chute portion.

11. In combination, means for supporting a wound strip of washers connected to a longitudinally extending side margin with connecting tabs, a continuously rotating feed roll having teeth engaging said tabs to feed the strip longitudinally past the assembly location, means for supporting the washers of the strip against upward and downward movement and lateral deflection as the washers of the strip pass said location, and means at said location for successively feeding screw elements in the direction of movement of the strip and at the same rate as the strip while converging upon the strip to mesh the screw elements with the moving washers as the washers pass said washer supporting means.

12. In combination, means for rotatably supporting a roll comprising a wound strip of washers connected to a longitudinally extending side margin by connecting tabs, a rotatable roll having teeth engaging said tabs to feed the strip with the washers attached past an assembly location, means for supporting the washers of the strip against lateral movement as they pass said location, means at said location for successively feeding screw elements in synchronism with the washers in a path converging upon the strip to mesh with the washers as they pass said washer supporting means, and means including a centralizing member movable longitudinally and laterally of the path of the moving strip and in timed relation to the movement of the strip to engage the shank of each screw as it converges upon the strip and align the free end of the shank relative to the moving washer with which it is to mesh.

13. In combination, means for supporting a wound strip of washers connected to a longitudinally extending side margin with connecting tabs, a rotatable roll having teeth engaging said tabs to feed the strip longitudinally past the assembly location, means for supporting the washers of the strip against upward and downward movement and lateral deflection as the washers of the strip pass said location, means at said location for successively feeding screw elements in the direction of movement of the strip at the same rate as the strip while converging upon the strip to mesh the screw elements with the washers as they pass said washer supporting means, and means including a centralizing member movable longitudinally and laterally of the path of the moving strip and in timed relation to the movement of the strip to engage the shank of each screw as it converges upon the strip and align the free end of the shank relative to the moving washer with which it is to mesh.

14. In combination, means for rotatably supporting a roll comprising a wound strip of washers connected to a longitudinally extending side margin by connecting tabs, a rotatable feed roll having teeth engaging said tabs to feed the strip with the washers attached past an assembly location, means for supporting the washers of the strip against lateral movement as they pass said location, means at said location for successively feeding screw elements in synchronism with the strip and in a path converging upon the strip to mesh with the washers as the washers pass said washer supporting means, and severing means positioned along the path of movement of the strip and beyond the assembly location for severing the side margin of the strip from each washer after assembly of a screw element with the washer.

15. In combination, means for rotatably supporting a roll comprising a wound strip of washers connected to a longitudinally extending side margin by connecting tabs, a rotatable roll having teeth engaging said tabs to feed the strip with the washers attached past an assembly location, means for supporting the washers of the strip against lateral movement as they pass said location, means at said location for successively feeding screw elements in synchronism with the washers in a path converging upon the strip to mesh with the washers as they pass said washer supporting means, means including a centralizing member movable longitudinally of the path of the moving strip and in timed relation to the movement of the strip to engage the shank of each screw as it converges upon the strip and align the free end of the shank relative to the moving washer with which it is to mesh, and severing means positioned along the path of movement of the strip for severing the side margin of the strip from each washer.

16. In combination, means for rotatably supporting a roll comprising a wound strip of washers connecting to a longitudinally extending side margin by connecting tabs, a continuously rotating roll having teeth engaging said connecting tabs to feed the strip longitudinally at a constant rate past an assembly location, means at said location for successively feeding screw elements at a constant rate in synchronism with the washers while converging upon the strip to mesh the screws with the washers as they are being fed continuously at said rate, a continuously rotating severing roll positioned in the path of feed of the strip and having teeth engageable with the connecting tabs to sever the washers from the strip after assembly of the screws therewith.

17. In combination, means for rotatably supporting a roll comprising a wound strip of washers connecting to a longitudinally extending side margin by connecting tabs, a continuously rotating roll having teeth engaging said connecting tabs to feed the strip longitudinally at a constant rate past an assembly location, means at said location for successively feeding screw elements at a constant rate in synchronism with the washers while converging upon the strip to mesh the screws with the washers as they are being fed continuously at said rate, a continuously rotating severing roll positioned in the path of feed of the strip and having teeth engageable with the connecting tabs to sever the washers from the strip after assembly of the screws therewith, a shaft operated in synchronism with the strip feed roll, said severing roll being adjustably mounted on said shaft for angular adjustment relative thereto to phase the teeth of the roll with respect to the connecting tabs of the strip.

18. In combination, means for feeding a strip of washers connected to a longitudinally extending side margin by connecting tabs, said means including a continuously rotating roll having teeth engaging said connecting tabs to feed the strip longitudinally at a constant rate past an assembly location, means at said location for successively feeding screw elements in synchronism with the washers while converging upon the strip to mesh the screw elements with the washers as the strip is moving at said constant rate, means positioned in the path of feed of the strip and beyond said assembly location for severing the side margin of the strip from the washers after assembly of the screws therewith, means for enlarging a portion of each screw element beneath the washer assembled therewith to retain the washer permanently assembled with the screw, and means for directing the assembled screws and washers from the severing means to the enlarging means.

19. In combination, means for feeding a strip of washers connected to a longitudinally extending side margin by connecting tabs, said means including a continuously rotating roll having teeth engaging said connecting tabs to feed the strip longitudinally at a constant rate past an assembly location, means at said location for successively feeding the screw elements in synchronism with the washers while converging upon the strip to mesh the screw elements with the washers as the strip is moving at said constant rate.

means positioned in the path of feed of the strip and beyond said assembly location for severing the side margin of the strip from the washers after assembly of the screws therewith, thread rolling mechanism for rolling on each screw element beneath the washer a thread to retain the washer permanently on the screw element, and means for directing the assembled screw elements and washers from the severing means to the thread rolling mechanism.

20. In combination, means for feeding a strip of washers connected to a longitudinally extending side margin by connecting tabs, said means including a continuously rotating roll engaging the connecting tabs to feed the strip longitudinally at a constant rate past an assembly location, an assembly mechanism at said location, said mechanism including a screw guide converging upon the path of movement of the strip, a continuously rotating screw feed wheel moving the screws along said guide in synchronism with the movement of the strip, a severing roll positioned in the path of movement of the strip for severing the side margin of the strip from the washers after the assembly of the screws therewith, means for cutting the strip, means for directing the strip after severance from the washers to the cutting means, means for enlarging each screw element beneath the washer to retain the washer permanently on the screw element, and means for directing the assembled screws and washers from the severing means to the enlarging means.

21. In combination, means for feeding a strip of washers connected to a longitudinally extending side margin by connecting tabs, said means including a continuously rotating roll engaging the connecting tabs to feed the strip longitudinally at a constant rate past an assembly location, an assembly mechanism at said location, said mechanism including a screw guide converging upon the path of movement of the strip, a continuously rotating screw feed wheel moving the screws along said guide in synchronism with the movement of the strip, a severing roll positioned in the path of movement of the strip for severing the side margin of the strip from the washers after the assembly of the screws therewith, means for cutting the strip, and means for directing the strip after severance from the washers to the cutting means.

22. In combination, means for feeding a strip of washers connected to a longitudinally extending side margin by connecting tabs, said means including a continuously rotating roll engaging the connecting tabs to feed the strip longitudinally at a constant rate past an assembly location, an assembly mechanism at said location, said mechanism including a screw guide converging upon the path of movement of the strip, a continuously rotating screw feed wheel moving the screws along said guide in synchronism with the movement of the strip, a severing roll positioned in the path of movement of the strip for severing the side margin of the strip from the washers after the assembly of the screws therewith, means for cutting the strip, means for directing the strip after severance from the washers to the cutting means, thread rolling mechanism for rolling on each screw element beneath the washer a thread to retain the washer permanently on the screw element, and means for directing the assembled screw elements and washers from the severing means to the thread rolling mechanism.

23. In combination, means for continuously feeding a strip of washers, each washer connected to a longitudinally extending ribbon-like side margin by a connecting tab, means positioned in the path of movement of the strip for feeding fasteners having washer receiving portions into meshing relation with the washers of the moving strip, means positioned in the path of the strip for severing the tabs from the washers after assembly of the fasteners with the washers, a drive shaft, and means connecting said drive shaft to said strip feeding means, said screw feeding means, and said severing means for synchronous operation.

24. In combination, means for continuously feeding a strip of washers connected to a longitudinally extending side margin by connecting tabs, means positioned in the path of movement of the strip for feeding screw elements into meshing relation with the washers of the moving strip, shearing means positioned in the path of the strip to shear the tabs from the washers after assembly of the screws therewith, a drive shaft, means connecting said drive shaft to said strip feeding means, said screw feeding means and said shearing means for synchronous operation, and an automatic clutch means for operatively disconnecting said strip feeding means and said screw feeding means from said drive shaft on interference with the movement of the strip.

25. In combination, means for continuously feeding a strip of washers connected to a longitudinally extending side margin by connecting tabs, means positioned in the path of movement of the strip for feeding screw elements into meshing relation with the washers of the moving strip, screw aligning means movably mounted for engaging and shifting the shank of each screw element into alignment with a washer as the shank approaches a position to mesh with the washers of the strip, means positioned in the path of the strip severing the side margin from the washers after assembly of the screws therewith, a drive shaft, and means connecting said drive shaft to said strip feeding means, said screw feeding means and said severing means for synchronous operation.

26. In combination, means for continuously feeding a strip of washers connected to a longitudinally extending side margin by connecting tabs, means positioned in the path of movement of the strip for feeding screw elements into meshing relation with the washers of the moving strip, screw aligning means movably mounted for engaging and shifting the shank of each screw element into alignment with a washer as the shank approaches a position to mesh with the washers of the strip, means positioned in the path of the strip severing the side margin from the washers after assembly of the screws therewith, a drive shaft, means connecting the drive shaft to said strip feeding means, said screw feeding means, and said severing means for synchronous operation, feeding means and means connecting said drive shaft to said aligning means for intermittently operating said aligning means in timed relation with the strip feeding means.

27. In combination, means for continuously feeding a strip of washers connected to a longitudinally extending side margin by connecting tabs, means positioned in the path of movement of the strip for feeding screw elements into meshing relation with the washers of the moving strip, screw aligning means movably mounted for engaging and shifting the shank of each screw element into alignment with a washer as the shank approaches a position to mesh with the washers of the strip, means positioned in the path of the strip severing the side margin from the washers after assembly of the screws therewith, a drive shaft, means connecting the drive shaft to said strip feeding means, said screw feeding means, and said severing means for synchronous operation, feeding means, means connecting said drive shaft to said aligning means for intermittently operating said aligning means in timed relation with the strip feeding means, and automatic clutch means in said connections for automatically disconnecting said strip feeding means, said screw feeding means and said screw aligning means from said drive shaft on interference with the movement of the strip.

28. In combination, means for feeding a strip of washers connected to a longitudinally extending side margin by connecting tabs, said means including a continuously rotating roll engaging the connecting tabs to feed the strip longitudinally at a constant rate past an assembly location, an assembly mechanism at said location, said mechanism including a screw guide converging upon the path of movement of the strip, a continuously rotating screw feed wheel moving the screws along said guide in synchronism with the movement of the strip, a severing roll positioned in the path of movement of the strip for severing the side margin of the strip from the washers after the assembly of the screws therewith, means for cutting the strip, means for directing the strip after severance from the washers to the cutting means, thread rolling mechanism for rolling on each screw element beneath the washer a thread to retain the washer permanently on the screw element, means for directing the assembled screw elements and washers from the severing means to the thread rolling mechanism, a drive shaft, a first connecting means connecting said drive shaft to said thread rolling mechanism, other connecting means connecting said drive shaft to said strip feeding roll, said screw feeding wheel and said severing roll for synchronous operation, said other connecting means including a pair of intermeshing gears one of which is connected to said drive shaft and the other of which is connected to said strip feeding roll, said screw feeding wheel and said severing roll, means for shiftably mounting one of said gears for movement into and out of mesh with the other of said gears, a third gear in mesh with the shiftably mounted gear, a rotatable eccentric on which said third gear is mounted, and means for manually rotating said eccentric whereby through said third gear to move said shiftably mounted gear out of mesh with said other of said intermeshing pair of gears operatively to disconnect said screw feed wheel, said screw feeding roll and said severing roll from said drive shaft while continuing the driving of said thread rolling mechanism by said drive shaft.

29. In combination, means for continuously feeding a strip of washers connected to a longitudinally extending side margin by connecting tabs, means positioned in the path of movement of the strip for feeding screw elements into meshing relation with the washers of the moving strip, means positioned in the path of the strip severing the side margin from the washers after assembly of the screws therewith, a drive shaft, means connecting said drive shaft to said strip feeding means, said screw feeding means and said severing means for synchronous operation, thread rolling mechanism operatively connected to said drive shaft, and means for directing assembled screws and washers from said severing means to said thread rolling mechanism.

30. In combination, means for continuously feeding a strip of washers connected to a longitudinally extending side margin by connecting tabs, means positioned in the path of movement of the strip for feeding screw elements into meshing relation with the washers of the moving strip, means positioned in the path of the strip severing the side margin from the washers after assembly of the screws therewith, a drive shaft, means connecting said drive shaft to said strip feeding means, said screw feeding means and said severing means for synchronous operation, an automatic clutch means for operatively disconnecting said strip feeding means and said screw feeding means from said drive shaft on interference with the movement of the strip, thread rolling mechanism operatively connected to said drive shaft, and means for directing assembled screws and washers from said severing means to said thread rolling mechanism.

31. In combination, means for continuously feeding a strip of washers connected to a longitudinally extending side margin by connecting tabs, means positioned in the path of movement of the strip for feeding screw elements into meshing relation with the washers of the moving strip, screw aligning means movably mounted for engaging and shifting the shank of each screw element into alignment with a washer as the shank approaches a position to mesh with the washers of the strip, means positioned in the path of the strip severing the side margin from the washers after assembly of the screws therewith, a drive shaft, means connecting said drive shaft to said strip feeding means, said screw feeding means and said severing means for synchronous operation, thread rolling mechanism operatively connected to said drive shaft, and means for directing assembled screws and washers from said severing means to said thread rolling mechanism.

MORITZ H. NIELSEN.

References Cited in the file of this patent

UNITED STATES PATENTS

| Number | Name | Date |
|---|---|---|
| 1,797,950 | Forman | Mar. 24, 1931 |
| 1,810,677 | Pfliffer | June 16, 1931 |
| 1,885,116 | Kuehner | Nov. 1, 1932 |
| 2,271,028 | Olson | Jan. 27, 1942 |
| 2,271,154 | Niskanen | Jan. 27, 1942 |
| 2,284,676 | Nielsen | June 2, 1942 |
| 2,284,698 | Trotter | June 2, 1942 |
| 2,288,620 | Goodhue | July 7, 1942 |
| 2,352,118 | Poupitch | June 20, 1944 |
| 2,390,121 | Poupitch | Dec. 4, 1945 |

FOREIGN PATENTS

| Number | Country | Date |
|---|---|---|
| 111,601 | Switzerland | Sept. 1, 1925 |